US008572649B1

(12) United States Patent (10) Patent No.: US 8,572,649 B1
Gossweiler, III et al. (45) Date of Patent: Oct. 29, 2013

(54) ELECTRONIC PROGRAM GUIDE PRESENTATION

(75) Inventors: Richard C. Gossweiler, III, Sunnyvale, CA (US); Mehran Sahami, III, Palo Alto, CA (US); Manish G. Patel, Mountain View, CA (US); John Blackburn, Newcastle, WA (US); David A. Brown, Moutain View, CA (US); Neha Gupta, San Jose, CA (US); Thomas H. Taylor, Redmond, WA (US)

(73) Assignee: Google Inc., Mountain View, CA (US)

( * ) Notice: Subject to any disclaimer, the term of this patent is extended or adjusted under 35 U.S.C. 154(b) by 751 days.

(21) Appl. No.: 11/742,515

(22) Filed: Apr. 30, 2007

(51) Int. Cl.
*H04N 5/445* (2011.01)

(52) U.S. Cl.
USPC ............... 725/39; 725/50; 725/53; 725/59

(58) Field of Classification Search
None
See application file for complete search history.

(56) References Cited

U.S. PATENT DOCUMENTS

| | | |
|---|---|---|
| 4,963,995 A | 10/1990 | Lang |
| 5,010,499 A | 4/1991 | Yee |
| 5,121,476 A | 6/1992 | Yee |
| 5,589,892 A | 12/1996 | Knee et al. |
| 5,793,438 A | 8/1998 | Bedard |
| 5,805,235 A | 9/1998 | Bedard |
| 5,808,694 A | 9/1998 | Usui et al. |
| 5,903,816 A | 5/1999 | Broadwin et al. |
| 5,940,073 A | 8/1999 | Klosterman et al. |
| 6,002,394 A | 12/1999 | Schein et al. |
| 6,005,562 A | 12/1999 | Shiga et al. |
| 6,005,565 A | 12/1999 | Legall et al. |
| 6,014,184 A | 1/2000 | Knee et al. |
| 6,112,186 A * | 8/2000 | Bergh et al. .................. 705/7.32 |
| 6,147,715 A | 11/2000 | Yuen et al. |
| 6,233,389 B1 | 5/2001 | Barton et al. |
| 6,263,501 B1 | 7/2001 | Schein et al. |
| 6,483,548 B1 | 11/2002 | Allport |
| 6,493,878 B1 | 12/2002 | Kassatly |
| 6,532,589 B1 * | 3/2003 | Proehl et al. .................... 725/40 |
| 6,640,337 B1 | 10/2003 | Lu |
| 6,681,395 B1 * | 1/2004 | Nishi .............................. 725/45 |
| 6,698,020 B1 * | 2/2004 | Zigmond et al. ................ 725/32 |
| 6,732,080 B1 * | 5/2004 | Blants .......................... 705/7.18 |
| 6,769,128 B1 | 7/2004 | Knee et al. |
| 6,771,886 B1 * | 8/2004 | Mendelsohn .................. 386/291 |
| 6,774,926 B1 * | 8/2004 | Ellis et al. ................... 348/14.01 |
| 7,103,905 B2 * | 9/2006 | Novak ............................ 725/47 |
| 7,328,450 B2 | 2/2008 | Macrae et al. |
| 7,398,542 B2 * | 7/2008 | Yamamura et al. ............. 725/58 |
| 7,493,015 B1 | 2/2009 | Van Stam et al. |
| 7,627,882 B2 | 12/2009 | Finseth et al. |
| 7,685,619 B1 | 3/2010 | Herz |
| 7,734,680 B1 | 6/2010 | Kurapati et al. |
| 2001/0027482 A1 * | 10/2001 | Ono et al. ...................... 709/219 |
| 2002/0133821 A1 * | 9/2002 | Shteyn ............................ 725/39 |
| 2003/0086694 A1 * | 5/2003 | Davidsson ..................... 725/58 |
| 2003/0126600 A1 | 7/2003 | Heuvelman |
| 2004/0158857 A1 * | 8/2004 | Finseth et al. .................. 725/39 |
| 2005/0047752 A1 * | 3/2005 | Wood et al. ..................... 725/58 |
| 2006/0028917 A1 * | 2/2006 | Wigginton ...................... 368/28 |

(Continued)

*Primary Examiner* — Brian Pendleton
*Assistant Examiner* — Dika C. Okeke
(74) *Attorney, Agent, or Firm* — Fish & Richardson P.C.

(57) ABSTRACT

A computer-implemented method includes receiving a request associated with a user for media-related programming information, obtaining a plurality of media episode indicators for a time period associated with the request and with the user, and generating code for displaying the plurality of media episode indicators in a calendar associated with the user.

22 Claims, 15 Drawing Sheets

(56) References Cited

U.S. PATENT DOCUMENTS

| | | | |
|---|---|---|---|
| 2006/0123449 A1* | 6/2006 | Ma et al. | 725/58 |
| 2006/0123455 A1* | 6/2006 | Pai et al. | 725/46 |
| 2006/0271960 A1* | 11/2006 | Jacoby et al. | 725/46 |
| 2007/0244900 A1* | 10/2007 | Hopkins et al. | 707/10 |
| 2007/0250859 A1* | 10/2007 | Ohkita et al. | 725/44 |
| 2008/0092127 A1* | 4/2008 | Richards et al. | 717/149 |
| 2008/0155547 A1* | 6/2008 | Weber et al. | 718/102 |
| 2008/0270449 A1 | 10/2008 | Gossweiler et al. | |
| 2008/0270886 A1 | 10/2008 | Gossweiler et al. | |
| 2008/0271078 A1 | 10/2008 | Gossweiler et al. | |
| 2008/0271080 A1 | 10/2008 | Gossweiler et al. | |
| 2009/0055385 A1 | 2/2009 | Jeon et al. | |

* cited by examiner

Google [    ] [Search Listings] [Search the Web]   Show search options / Create a filter

Quick Contacts
[Search, add or invite]

○ Rich Gossweiler
  Sign Into Chat
○ Bay-Wei Chang
○ Kurt MacDonald
○ mr degauss
○ Patrick Goddi
  Rakhi rajani
  Tom Orsi
  White, Krysten Add contact  Show all

Tags
TV
Myth
mustache

---

Discovery CHANNEL  Mythbusters  [I Like This]

☆ Episode #1 Flying Kites

☆ Episode #28 Dropping a Penny
☆ Episode #29 Cooling a Six-Pack   (Tues) 3 Mar 5:00 pm
Ancient batteries: rebuilduing a crash test dummy;   [TV PG]
Fastest way to cool a six-pack of beer
                                                                    [Record]
60 minutes   Original air-date: June 9, 2005

Google Web Results

Mythbusters Fan Club
The Mythbusters Fan Club. The UnOfficial Fan Club of the popular television series The Mythbusters on the Discovery channel.
www.mythbustersfanclub.com/ - 15k - Cached - Similar pages general.html
In the show, we're the Mythbusters, and we prove and disprove urban legends by experimenting with them. It's Jack meets Mr. Science. ...
www.adamsavage.com/tvshow.html - Similar pages

MythBusters TV Show - MythBusters Television Show - TV.com
MythBusters TV Show, TV.com is your reference guide to MythBusters Show. Episode guide, photos, videos, cast and crew information, forums, reviews and more.
www.tv.com/mythbusters/show/22839/summary.html - 94k

MythBusters (a Titles and Air Dates Guide)
A guide listing the title and air date for each episode of the TV series MythBusters.
epguides.com/MythBusters/ - 24k - Apr 15, 2007 - Cached - Similar pages

---

Expand all   Print

Google Video Results

Google Image Results

Sponsored Links

Mythbusters
Looking for Mythbusters? Find exactly what you need at www.eBay.com

Missed an Episode?
Download Mythbusters Episodes to watch anytime.
www.TVShows.org

FIG. 2B

Friday - Sept 1

Fri | Sat | Sun | Mon | Tue | Wed | Thu | Now | Next week
12a 1 2 3 4 5 6 7 8 9 10 11 12p 1 2 3 4 5 6 7 8 9 10 11

FIG. 3

ELECTRONIC PROGRAM GUIDE PRESENTATION

TECHNICAL FIELD

This document discusses mechanisms and techniques for providing program guide information to a user of an electronic display device such as a desktop or laptop computer, a set top box, or a mobile telephone or PDA.

BACKGROUND

Some figures suggest that the average household receives seven hours of television programming per day. Whatever the actual figure, it is true that many households watch a whole lot of television. Yet the manner in most households select the television or videos they watch is very unsophisticated. Most people channel surf, and sometimes use electronic program guides that display a schedule grid of programs that are showing on various channels at various times of the day. These guides commonly display information about a number of programs in a grid of cells arranged by channel and time—much like their predecessor paper guides, such as those published in the old TV Guide magazines and in newspapers. The information, when displayed on a display device like a television, may be static, in that it is simply displayed to a user on a particular channel, such as in a continuously scrolling grid of channels. The information may also be interactive, in that users can scroll through the grid themselves and can select a certain cell to be switched to a program represented by the cell.

This process of scanning around for programming can result in a viewer watching television programs that are not suitable for them, when suitable programs could easily be recorded and watched later, or the viewer could take time out from other activities if the viewer could adequately plan for the viewing. Improved interaction with program guides and an ability to better find and interact with programming information can greatly increase the ability of users to find and manage programming that best suits their needs. As a result, such users can have a better viewing experience and can also watch more of what they enjoy and less of sub-par programming.

SUMMARY

This document describes mechanisms and techniques that may be employed to assist users in finding media programming in which they may have an interest, and that can provide additional information about, or access to, that programming. Generally, the mechanisms and techniques permit for the display of program guide information to a user in a variety of ways that match with the user's particular needs.

Such techniques may, in certain implementations, provide one or more advantages. For example, user may choose to see their media selections and options via various formats that best suit them. Also, users may see such information integrated with their other information such as their personal schedules, electronic mail information, or as a gadget on a personalized home page. Such accessibility to the information may permit the user to miss fewer important programs and to share information about programming more easily with acquaintances. As a result, such a user may be more likely to watch additional programming, and to thereby generate additional advertising revenue for a content provider. The content provider thus benefits, as does the advertiser (which is obviously paying for the additional advertising because it produces additional incremental profit).

In one implementation, a computer-implemented method is disclosed. The method includes receiving a request associated with a user for media-related programming information, obtaining a plurality of media episode indicators for a time period associated with the request and with the user, and generating code for displaying the plurality of media episode indicators in a calendar associated with the user. The request can be received from a gadget on a personalized web page associated with the user. Also, each program indicator can include an icon, wherein selection of the icon may cause details regarding the program to be displayed. The method may further comprise determining the media programs that are associated with the user by search a user information database storing a personalized programming schedule of programs selected by the user.

In some aspects, the method can further comprise receiving from the user a selection of one or more program episodes to add to a personalized media schedule for the user, and generating code for displaying the added episodes in the calendar. The selection of one or more program episodes can also comprise a click on the episodes followed by dragging of the episodes to an area defined by the calendar. In some aspects, the method further comprises receiving a command to share a program and causing an invitation to join a showing of the program to a second user. Also, the method can further comprise adding information about the plurality of media programs to the user's general daily calendar schedule.

In other aspects, the method includes generating code for displaying categories of programs in the calendar and for showing different categories with differing visual groupings. In addition, the method can include receiving a search request including media-related terms, generating a response to the request of one or more programs, and generating code for displaying the one or more programs on the calendar. And the method can include generating one or more advertisements targeted to the calendar content.

In another implementation, a computer implemented method is disclosed that includes receiving a user command to display a personal calendar, submitting a request to a central information provider for calendar-related information, and in response to the request, receiving calendar-related information including personal schedule information combined with personalized media programming, and displaying a calendar containing the personalized media programming. The method can also include alerting the user of conflicts between personal schedule information and personalized media programming in the calendar. The user command can be received by a portable program module in a personalized home page. Also, the method can include displaying detail about a program in the calendar when a pointer floats over a visual presentation for the program. In other aspects, the method further comprises displaying a plurality of media-related search results having one or more program groupings simultaneously with the calendar. And in certain aspects, the method includes receiving a selection of a control associated with a program displayed in the calendar, and displaying a details page containing particularized information about the episode.

In another implementation, a computer-implemented system is disclosed. The system includes a request processor for receiving and parsing requests for media programming related information, a user information database storing information relating to media programs in personalized program guides for a plurality of users, and a grid builder configured to generate code for causing a display of calendars containing personal schedule information and media programming information for registered users. The grid builder can generate XML data for processing by a portable program module in response to a JavaScript-initiated request. Also, the grid builder can generate code for processing by a portable program module with a redisplay of the calendar. Moreover, the system can include a page formatter configured to generate code for displaying one or more media-related search results simultaneously with the calendar.

The details of one or more embodiments are set forth in the accompanying drawings and the description below. Other features, objects, and advantages will be apparent from the description and drawings, and from the claims.

DESCRIPTION OF DRAWINGS

FIGS. 1A-1C show particular displays from FIG. 1.

FIG. 2B shows a display of an example media program details page.

FIG. 3 shows an example of a schedule bar for use with a program schedule grid.

Like reference symbols in the various drawings indicate like elements.

DETAILED DESCRIPTION

Figure 1:
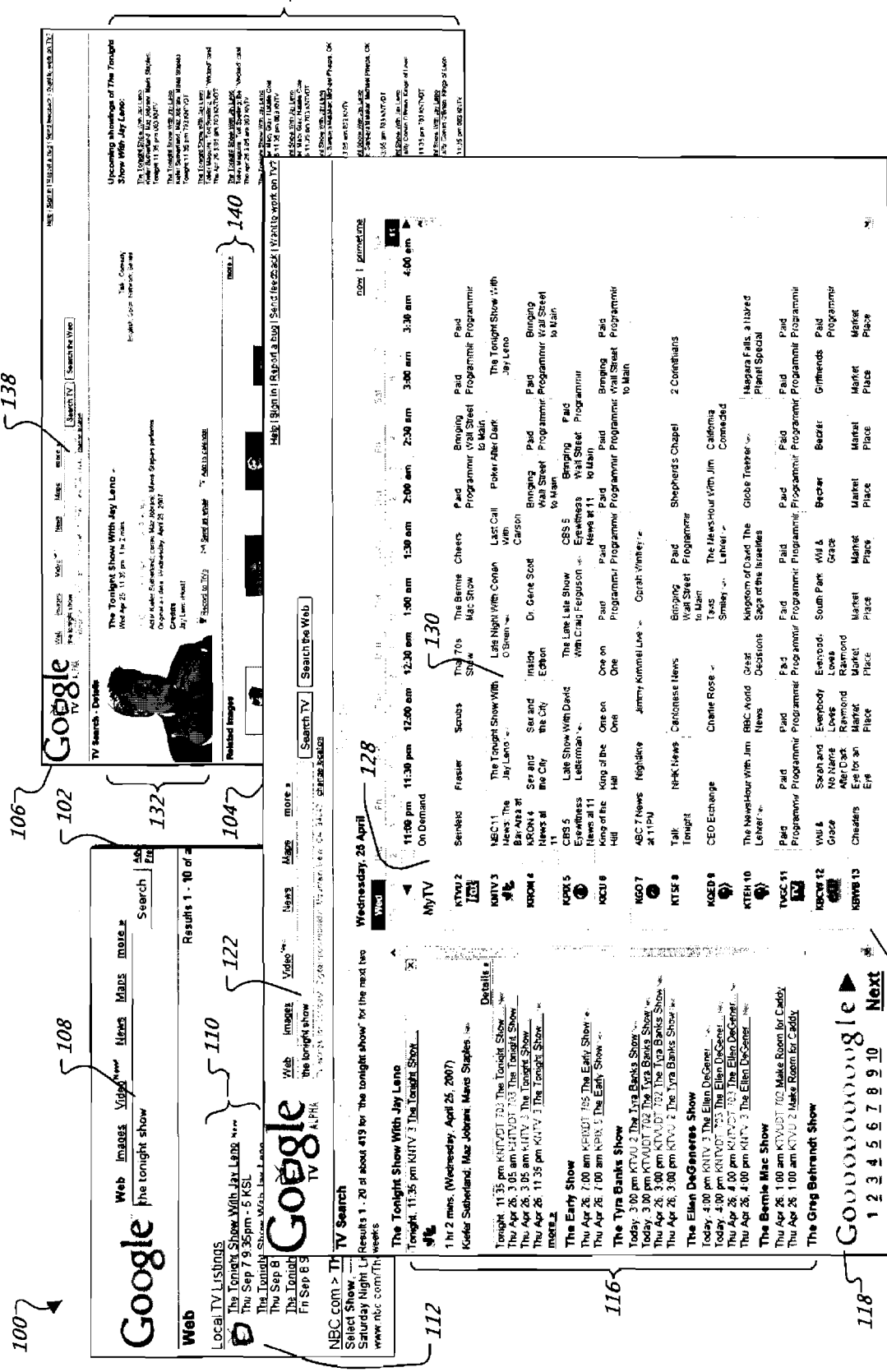
FIG. 1 shows displays illustrating interactions provided by an example program guide system.
Figure 1A:
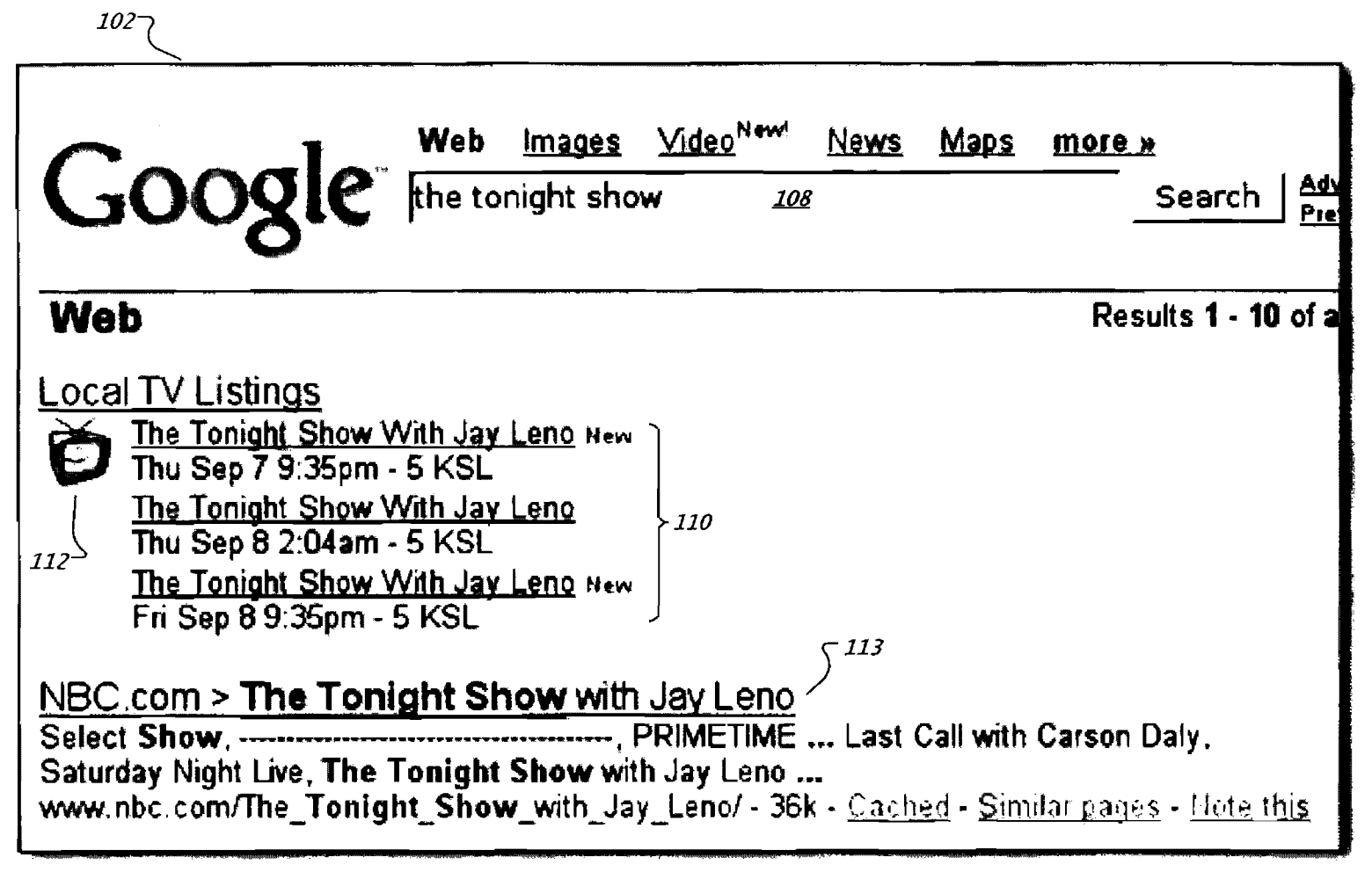
Figure 1B:
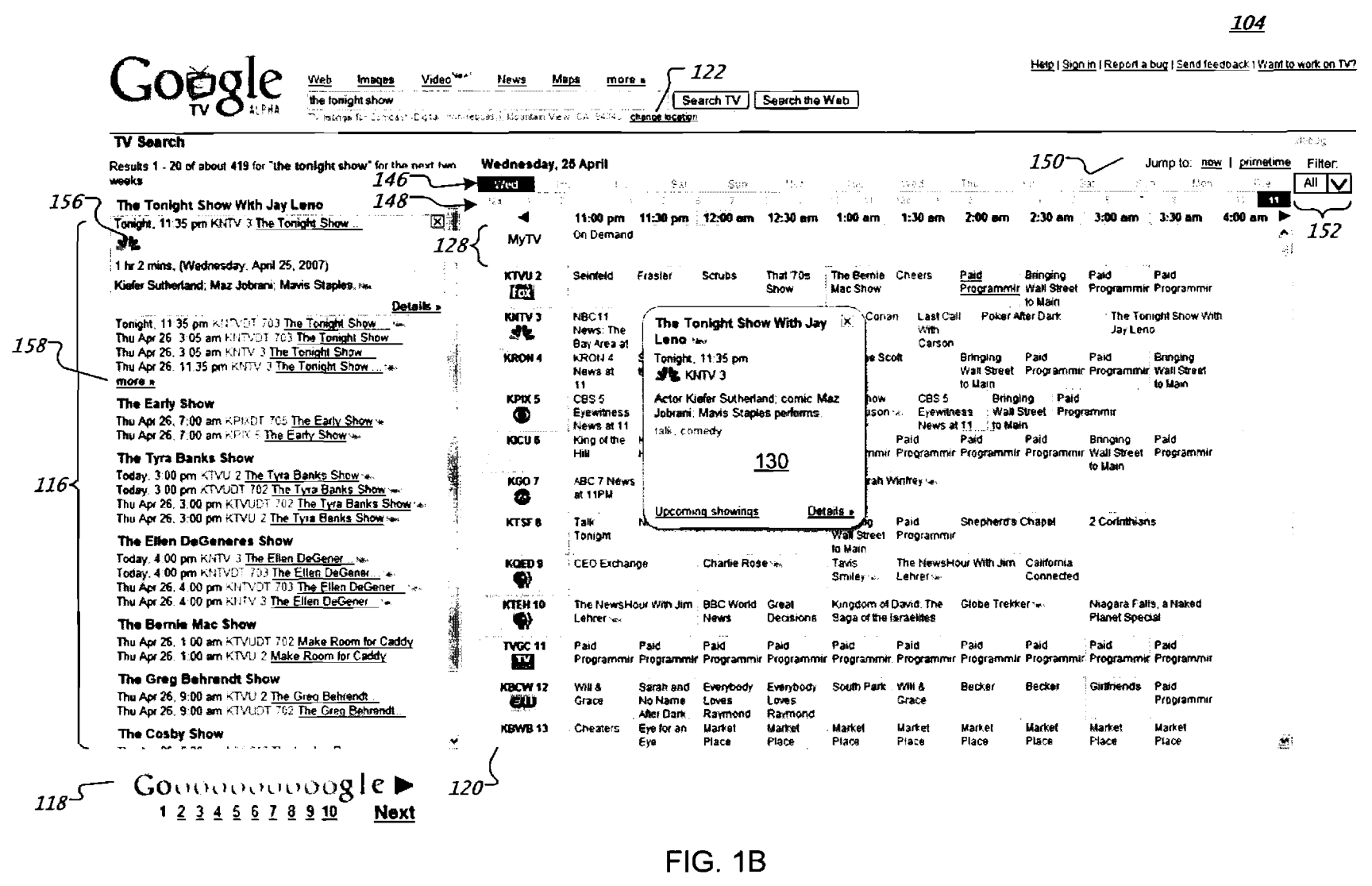
Figure 1C:
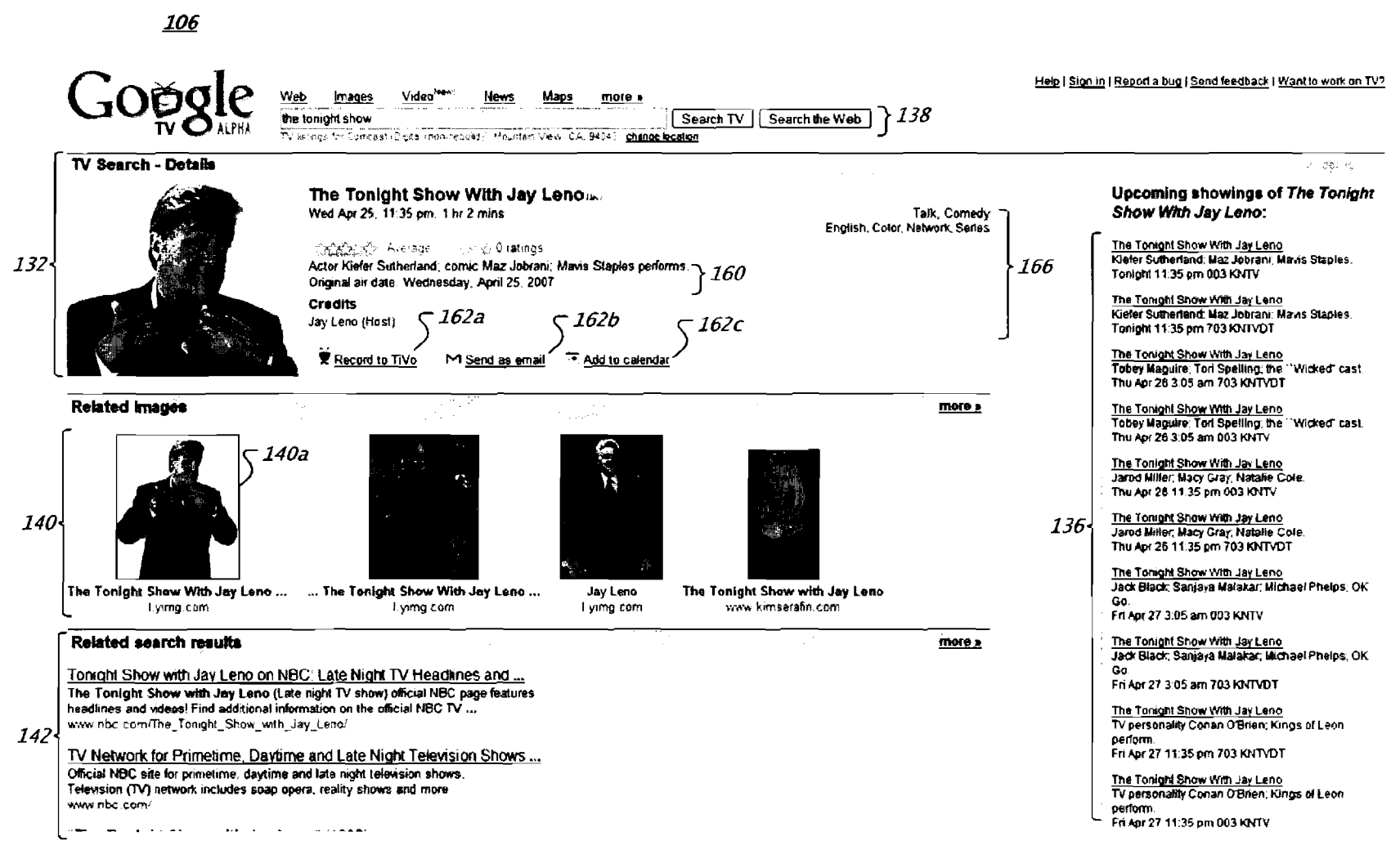

FIG. 1 shows displays illustrating interactions provided by an example program guide system 100, and FIGS. 1A, 1B, and 1C show particular displays from FIG. 1. In general, the program guide system 100 allows a user to search for media programming (e.g., broadcast television, cable television, satellite television, broadcast radio, satellite radio, and Internet media) by making a search request using a search page 102. The program guide system 100 presents, on the search page 102 and/or on a landing page 104, search results that are based on the search request.

The search results include a list of one or more collections of programs related to the search request—grouped by episodes of a program. An episode as used here can include a particular showing in a series of showings (such as an episode of a sitcom), or may include a single episode of a program (such as a movie or a discrete on-line video). The search results also include a program schedule grid 120 that displays a list of channels and program episodes presented by each of the channels for a particular time period. At least one of the program episodes in the schedule grid relates to the search request made by the user. In response to a user selection of a program in the schedule grid or the list, the program guide system 100 presents detailed information associated with the program in a details page 106.

In more detail, the search page 102 includes a search box 108 where a user may input a search term, such as a portion of a television program name. The search page 102 presents preliminary search results based on the search term input. The preliminary search results may include, for example, a list of web pages having information related to the search term. In addition, the preliminary search results may include a list 110 of media programming related to the search term. The media programming list 110 may include text, such as "Local TV Listings," that identifies items in the list 110 as media programming as apposed to web page items. The media programming list 110 also includes one or more media icons 112 that indicate the types of media programming presented in the list 110, e.g., a television, radio, or webcast icon.

Where the system is able to determine that a search request was likely media-related, it can group the media results in a manner that differs from an ordinary list of search results. Specifically, as shown, each of the listings on search page 102 is shown with a title, time, and channel, whereas standard search results may be shown with a title, snippet, and URL. This special formatting of a search result may be referred to as a "one box." Other search results, such as weather, location, and similar results may also be presented in a specially-formatted one box.

The program guide system 100 may present a landing page 104 in response to a user selection of an item in the list 110. The landing page 104 includes media result groupings 116. The groupings 116 list one or more collections of programs related to the search term. The groupings 116 group collections of programs, for example, by program name with each item in a grouping being a particular episode or airing of the program. Alternatively, the groupings 116 may be grouped using another parameter, such as grouping by the media channel presenting the programs, a genre of the programs, or the time of day the programs are presented. An additional results control 118 allows a user to navigate to other groupings that are not currently displayed, and that may be groupings considered to be less responsive to the user's request.

Each of the groupings 116 may also include a "more" control 158 that lists additional results within the particular grouping. In the pictured example, the three next-pending programs are shown for the media grouping associated with the television program "The Tonight Show", and a user can select the "more" control 158 to show addition programs further in the future. Such a selection may cause the Tonight Show grouping to expand and may also cause the other groupings to be removed to make room for the expanded grouping.

The groupings can also include an "Add to my TV" control that, when selected, can add a particular program (such as a series of episodes) or episode to a personalized program guide for the user. For example, a "My TV" channel may be maintained for a user, as described below, and an episode or all the episodes of a program may be added to that channel when the "Add to my TV" control is selected.

The landing page 104 also includes a schedule grid 120. The schedule grid 120 is displayed adjacent to and side-by-side with the groupings 116. The schedule grid 120 presents programming for a particular geographic location. A user may specify or change his or her location by selecting a change location control 122 and by making an input, such as a postal code (e.g., a ZIP code) or city and state names. The selected location may also be used to determine the programs presented in the list 110 and the groupings 116. Where the user is a user registered with the system 100, the user's default location may be used to generate programming suggestions.

The schedule grid 120 presents media programming for a particular time range on a particular date, such as over several hours. A user may select the date using a calendar control 146. The calendar control 146 may default to a particular date, such as the current date. When a search is performed, the grid 120 may default to the area surrounding the time and channel of the episode determined to be a best search result. Selection of other episodes in the groupings 116 may cause the grid to move automatically to display programs around the selected episode (or the first-returned episode for a particular grouping, if a grouping is selected).

The schedule grid 120 presents a list of media channels vertically along its left side and times of day horizontally along its top side in a time bar 148. The programs or episodes for a particular channel are presented in the channel's row and in a column having a time division closest to the actual time that the program is presented by its associated channel. The channels may be associated with a particular numerical channel for a broadcast, or may be a virtual channel such as a personalized channel or a stream of information over the internet.

The schedule grid 120 also includes a personalized channel 128, termed here as "My TV." The personalized channel 128 includes controls that allow a user to create a virtual channel using content from actual channels or another personalized channel, such as the personalized channel of another user. Episodes or programs may be added to the personalized channel 128 in a variety of ways. For example, a user may select a program in the schedule grid 120, and may select a command to move it to the personalized channel 128 or may drag it to the personalized channel, among other things.

Also, one user may send a message to another user that identifies a particular program, such as by supplying a URL to an on line video, supplying an episode ID number, or through another accepted mechanism. In addition, the user may select a control such as the "Add to My TV" control, where that control is associated with a program or episode.

The schedule grid 120 includes the personalized channel 128. The personalized channel 128 is presented near the top of the grid 120 and slightly separated from the other channels to indicate that its programs are specified by the user rather than by a media provider broadcast. The personalized channel 128 can include multiple overlapping programs, and a user may be provided with various mechanisms with regard to watching and managing such programs. As one example, the programs may be displayed initially according to the times they are broadcast or are first made available for download. The user may then drag them later into time so that they do not overlap, so as to "program" a viewing schedule that the user may later follow. Programs that are shifted in time from their actual broadcast time may be recorded when they are broadcast, such as by a PVR, and may be displayed according to the program the user has established. In this manner, a user can easily select programs to view, see whether the selected programs can be viewed when they are broadcast, and view the programs in a selected order as if they were live programs, but by time-shifting the programs in some selected manner. The personalized channel 128 is described in more detail with respect to FIGS. 4A and 4B below.

A selected program cell 130 may be used to initiate an operation related to the program in other ways also, such as navigating a user to a display that presents more detailed information regarding the program. The details page 106 presents such detailed information. The details page 106 includes a program details area 132. The program details area 132 presents detailed information regarding the program, such as a genre of the program, a runtime length of the program, names of performers in the program, a content rating of the program, a quality rating of the program, and a synopsis of the program.

The program details area 132 also includes an upcoming episodes area 136. The upcoming episodes area 136 presents a list of the upcoming episodes for the program. The list may include detail information such as an episode title, a time for the showing, and a channel on which the showing is to occur.

The details page 106 also includes a search control 138. The search control 138 allows a user to input a search term to initiate a search for a particular program. The search may be limited just to a corpus of information associated with programming, or may be performed on an entire web page corpus, depending on a selection from the user.

The details page 106 also includes an image details area 140. The image details area 140 presents images associated with the program, such as image result 140a. The image result 140a may be found by performing an Internet search for images related to the program, such as would be returned by the standard "Google Images" service. The search may be constrained in particular ways, such as by searching on a particular programming-related corpus of images or by adding certain terms, such as "television" to the query so that "Fred Thompson" returns images of the actor and not of other people. Details including a snippet, image details, and a URL that displays the image, are also provided in image details area 140.

The details page 106 also includes a search details area 142. The search details area 142 may present the results of a search for web pages related to the program, such as a search result 142a. The search details area 142 may simply be a proxy of results that would be shown in response to a standard search for the episode name when applied to a full corpus or a corpus limited to programming related information. Controls may also be provided so that the user can access more episodes, more image results, more search results.

In operation, a user may initiate the program guide system 100 either by inputting a search term, such as "The Tonight Show," for a general web search using the search control 108 or a media programming search using the search control 138. In the case of the search control 108, the program guide system 100 presents the list 110 of programs related to the search term "The Tonight Show" within the search page 102 as part of a one box. Selecting a program in the list 110 directs the user to the landing page 104.

Alternatively, a user may input the search term for "The Tonight Show" using the media programming search control 138, such as is displayed on the landing page 104 or the details page 106. The search input directs the user to the landing page 104.

At the landing page 104, a user may direct the schedule grid 120 to a particular channel, time, and date by selecting a program from the groupings 116. The groupings 116 are programs determined using the search term "The Tonight Show." Each program grouping includes one or more episodes of that particular program. The user may navigate to groupings not currently presented using the additional results control 118. Selecting a particular episode in a program grouping directs the schedule grid 120 to a particular channel, time, and date. The user may also navigate through the schedule grid 120 manually using controls, such as the calendar 146 and the time bar 148. In addition, the user may "drag" the control up, down, left, or right similar in manner to moving a map in Google Maps, and cells in the grid may be added from a queue to be displayed, and additional cells may be fetched or pre-fetched, in the manner of fetching tiles around a display in Google Maps.

Such fetching of tiles may occur by various mechanisms. For example, the system may simply pre-fetch tiles that surround the area currently being displayed (within a certain number of tiles). Also, the fetching may proceed to fill in all channels at a currently displayed time, and then fetching information in the future or in the last direction of time-wise travel in a grid (e.g., if a user's last move was to the right, then future tiles will be fetched). This technique operates under the assumption that people are more likely to surf through channels than to look into the past or future. Under a third technique, the pre-fetching may approximate the momentum of the movement of the grid—much like air over the surface of a moving wing. More material is pre-fetched in the direction of motion (where there can be three dimensions: time, channel, and level of detail). Where motion is particularly fast, more material is fetched in the directed of motion and less to the sides of the grid. As a user's motion slows, more data in other dimensions away from the motion may be pre-fetched.

Regarding a third grid dimension for detail level, such a dimension may be implemented in various manners. In one such implementation, at a least detailed level, a program title and little more may be shown in a grid so as to permit maximum density of tile display. At a more detailed level, a rating and a short description of an episode may be shown. At a yet more detailed level, more detailed description may be shown, and an image may be shown. At a more detailed level, information duplicating or approaching that shown for the detail page 106 may be shown.

The user may navigate to the details page 106 for a particular program by selecting (e.g., clicking or double-clicking on) the program in the schedule grid 120, such as the selected program cell 130. At the details page 106, a user may view detailed information regarding the program in the program details area 132. The detailed information may be obtained, for example, from a structured database that organizes media content according to programs, actors, and other similar parameters and links the information in a relational manner.

The user may view images related to the program in the image details area 140. The images may be obtained from a structure database, such as a database associated with the detailed information, or may be obtained from disparate sources such as in the manner of Google Image Search. The user may navigate to an image by selecting an image result, such as the image result 140a.

The user may navigate to a web page related to the program by selecting a search result, such as the search result 142a, in the search details area 142. The user may also select an image in image details area 140 to have the image associated with the program. For example, the selected image may then be displayed in the details area 132 in place of the prior image, or a portion that is cut out of the image may be displayed in the grid 120, such as in cell 130, so that a user can make particular favorite programs more visible in the grid in a manner that the user can visually associate the cell 130 with the program (e.g., by selecting a logo or title associated with the program).

Figure 1D:
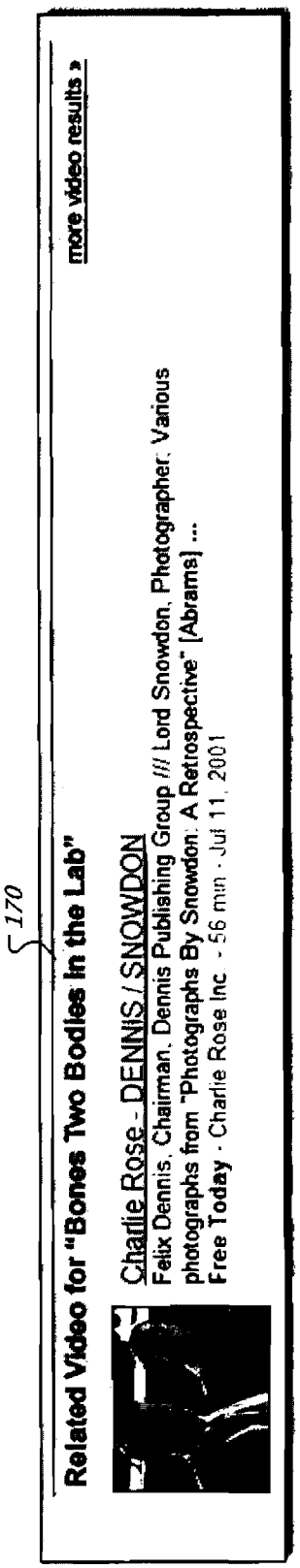
FIG. 1D shows an example video result for a media details page.

FIGS. 1A-1C show particular displays from FIG. 1 in more detail. FIG. 1D shows a display of video-based results. FIG. 1A shows the search page 102. The search page 102 allows a user to search for web content using the search control 108. The program guide system 100 determines that the search term (e.g., "The Tonight Show") may be a media program. For example, if the search term matches a media program name (such as a term stored in a "white list" of media-related terms) or the search term is included in a media program name, then the program guide system 100 may generate and present the list 110 of media programs.

Alternatively, the search term may be another attribute of a media program, such as the program's channel, an actor in the program, or the program's format (e.g., drama or situation comedy). A user may also "force" a media search, such as by preceding a search term with a prefix such as "tv", "tv:", or "television." In addition to a name of a media program, the list 110 presents a time, date, and channel for the media program. The list 110 also indicates whether the particular presentation of the program is new or a repeat. The results in the list 110 may be ordered by relevance to the search term, whether the program presentation is new, and/or the date and time that the program is presented.

The media icon 112 indicates that the list 110 presents media programs. The media icon 112 visually distinguishes the list 110 from general web page search results, such as web page search result 113. The search result 113 is also related to the search term "The Tonight Show." The search result 113 includes a title that identifies the web page, a uniform resource locator (URL) to navigate to the web page, a link to a cached copy of the web page, a link to web pages similar to the web page, and a link to note the web page, such as in a personalized web notebook like Google Notebook. Noting the web page stores information about the web page in a web notebook associated with the user.

FIG. 1B shows the landing page 104 including the media result groupings 116 and the schedule grid 120. The groupings 116 present a list of episodes, grouped by program, matching a particular search term. The matching programs are selected from channels that are available to the user, such as from local broadcast or other media providers. A particular head-end associated with the user may also be associated with the displayed programs.

The location and media providers accessible by the user may be selected using the change location control 122. The change location control 122 will be described in more detail with respect to FIG. 2A.

The schedule grid 120 presents the programs matching the search term as well as other programs occurring around the time of the matching program. Selecting a particular instance of a program (e.g., an episode or broadcast) in the media result groupings 116 moves the schedule grid 120 up or down to a channel associated with the program, and left or right to a time associated with the program. This presents the program instance in the schedule grid 120. The schedule grid 120 may immediately present the selected program positioned properly in the grid or may gradually present the program, such as by slowly scrolling to the grid location of the program.

In certain implementations, a user may select a program instance or episode in the schedule grid 120 to generate a new list of programs in the media result groupings 116 related to the selected schedule grid program. In such a situation, the selected program name or another program attribute may be submitted as a programming-directed search request to the system in generating a new landing page 104. For example, if a user selects the cell for "South Park," the grid 120 may re-center on that cell, and the groupings 116 may include programs such as "Beavis & Butthead," (another animated comedy), "The West Wing" (because of the directional reference), and other similar programs.

Programs in the schedule grid 120 that also appear in the groupings 116 are highlighted to indicate that they match the search criteria that generated the groupings 116. The highlighting may be, for example, a shading, color, grid cell size, or cell border thickness that differentiates the schedule grid programs satisfying the search condition from schedule grid programs that do not satisfy the search condition. In certain implementations, the shading, coloring, or sizing varies based on, for example, the closeness of the match between the search term and the program. The shading, coloring, or sizing may also vary with the degree of separation between programs matching the search term and programs related to the matching programs. One manner in which such closeness or separation may be shown is by relative colors of the cells in a grid, similar to the display of a thermal map, with colors ranging steadily from blue (farthest) to red (closest), or another appropriate color scheme.

For example, a user may input a search term such as "Star Trek II: The Wrath of Kahn." Instances or episodes of the movie "Star Trek II: The Wrath of Kahn" in the schedule grid 120 may be highlighted with a first highlighting that is more significant than subsequent highlighting (e.g., a bright color (red for close hits moving to blue for farther hits), dark shading, or large sizing). Instances of Star Trek movies other than "Star Trek II: The Wrath of Kahn" in the schedule grid 120, such as "Star Trek: The Motion Picture," "Star Trek III: The Search for Spock." "Star Trek IV: The Voyage Home," "Star Trek V: The Final Frontier," "Star Trek VI: The Undiscovered Country," "Star Trek: Generations," "Star Trek: First Contact," "Star Trek: Insurrection," and "Star Trek: Nemesis," may be highlighted with a second highlighting that is less significant than the first highlighting. The second highlighting indicates that the associated programs may not match the search term, but they are related to the programs that match the search term (e.g., they are other Star Trek movies). In addition, episodes of Star Trek series programs, such as "Star Trek: The Original Series," "Star Trek: The Animated Series," "Star Trek: The Next Generation," "Star Trek: Deep Space Nine," "Star Trek: Voyager," and "Star Trek: Enterprise," in the schedule grid 120 may be highlighted using a third highlighting that is less significant than the second highlighting. The third highlighting (e.g., no highlighting at all) indicates that the Star Trek series programs may not match the search term and may not be the same type of media as the programs matching the search term (e.g., movies), but they are related to the programs through the Star Trek genre.

In another example, a user may input a search term for media programs having a particular actor or performer, such as "Leonard Nimoy." Media programs in the schedule grid that include the actor "Leonard Nimoy," such as "Star Trek: The Original Series," are highlighted with a first highlighting. Media programs having actors that have at some time performed with "Leonard Nimoy" are highlighted using a second highlighting. For example, episodes of "T.J. Hooker" and "Boston Legal" may be highlighted using the second highlighting as they include the actor William Shatner who starred with Leonard Nimoy in "Star Trek: The Original Series." However, episodes of "T.J. Hooker" in which Leonard Nimoy guest starred or directed may be highlighted using the first highlighting. The highlighting may also occur by placing images in the cells, so that programs involving Nimoy include a partial photographic portrait of Nimoy, and programs involving Shatner include a partial photographic portrait of Shatner.

In addition to highlighting programs matching the search terms in the schedule grid 120, the groupings 116 may also highlight the programs. The highlighting used in the groupings 116 may match the highlighting used in the schedule grid 120 for corresponding media programs. The groupings 116 may also present the media programs that are related to the media programs matching the search term.

The overall groupings 116 themselves may also be highlighted, such as by including an image associated with each grouping as a watermark behind the grouping. Such an additional feature (not shown) may add decorative interest to the search results, and may also provide additional information to a user. For example, a user may have no idea what the text "Square Pegs" means (e.g., as presented in response to a search for "Freaks and Geeks" or "Square One"), but when shown a background photo that includes Jami Gertz, Tracy Nelson, and Sarah Jessica Parker, they may instantly recognize the iconic Emmy-nominated 1982 program about Weemawee high school.

The schedule grid 120 has an associated calendar control 146. The calendar control 146 includes tabs that allow a user to select a particular date or day of the week. Each tab includes hours of the day associated with the tab. Selecting a time interval in the tab directs the schedule grid 120 to present programs for the selected day and time interval. The calendar control will be described in more detail with respect to FIG. 3.

The schedule grid 120 has a time bar 148 that indicates the times of day that programs in the schedule grid 120 are presented. The time bar 148 includes controls that allow a user to move to an earlier or later time or date. Alternatively, a user may move the schedule grid 120 by another method, such as by clicking on the grid 120 and dragging the grid 120 to a new time or date. The clicking and dragging may also move the grid 120 to present other channels. Alternatively, a user may use a control, such as a scroll bar, to move through the list of channels in the grid 120. As a user moves through times, dates, and channels in the grid 120, the landing page 104 may download data for channels and times/dates outside the periphery of the grid 120. This allows the grid 120 to present the programs for the channels and times that appear as a user moves the grid 120, without having to pause to download them.

The schedule grid 120 has an associated jump control 150 and an associated filter control 152. The jump control 150 allows a user to quickly move to the current time and date in the grid 120 or to a primetime (e.g., 8:00 PM) for the current day. The filter control 152 can be used to filter out various parts of the grid. For example, the filter may be used to show only prime time or late night programming, so that, for example, the grid jumps from 11:00 PM directly to 8:00 PM the next day. Likewise, the filter can be used to show only channels in a particular category, such as only movies channels or sports channels, or channels specifically selected by a user as their "favorites" channels.

The media results groupings 116 provide a compact area to view the results of the media programming search. Particularly, each grouping may present a number of programs that is less than the total number of programs in the grouping. For example, each grouping may represent a media program series and may present up to three episodes from the series. A program identifier 154 identifies the name of the series or grouping. The episodes or instances of the program are represented by schedule entries 156. A "more" control 158 indicates when more episodes or program instances exist that are not shown in the schedule entries 156. The "more" control 158 also indicates how many more entries exist. A user may select the "more" control 158 to present the additional entries. In addition, a user may select the "additional results" control 118 to present additional groupings. The "additional results" control 118 indicates the number of additional pages of media results groupings. A user may select a particular page of media results groupings to be presented in the groupings 116.

When the landing page 104 is resized, for example as a result of a user input, the schedule grid 120 may be resized accordingly. The addition or subtraction of page space may be divided among the cells of the grid 120. The cells of the grid may have minimum and maximum sizes, such that if the minimum or maximum sizes of the cells are reached rows and/or columns may be removed or added, respectively, from the grid 120. The resizing, addition, and subtraction of cells in the grid 120 may be performed by a client-side script in a web browser, such as JavaScript.

Alternatively, or in addition (such as after the cells have reached a minimum size) the cells may be maintained in constant size and the grid 120 may have its channel and time dimensions shrunk or expanded as the window is decreased or increased in size respectively. Thus, for example, as the window is decreased in size, programs may be cut off from the grid in half-hour increments and channel-by-channel with the cell size maintained. In this manner, navigation of the grid 120 may occur in the same way (e.g., dragging of grid cells) even when the window is shrunk, and there need not be a need for scroll bars in the navigation.

FIG. 1B shows an additional details box that is not shown in the corresponding display in FIG. 1. The details box may be generated, for example, when a user hovers a mouse pointer over a particular cell for a sufficient period of time. The details box may show additional information as provided in the figure, and may also include controls whose selection causes a list of upcoming showings of the program to be displayed, or causes a details page to be displayed.

FIG. 10 shows the details page 106. As previously described, the details page 106 includes the program details area 132, the image details area 140, and the search details area 142. The program details area 132 shows a list 160 of actors associated with the presented program. A user may select an actor in the list 160 to initiate a search of media programming for the selected actor. The search may direct the user to the landing page 104. Alternatively, such a selection may obtain a details page associated with the actor, such as from the iMDB web site. Similar actions may be taken with respect to producers and others who might be associated with a program.

The program details area 132 includes actions 162a-c that may be performed using the program. The actions 162a-c are described in more detail with respect to FIGS. 6A-6D. The program details area 132 also includes information 166 associated with the program, such as an image from the program, the name of the series or program, the name of the episode, a synopsis of the episode, the date and time the program is scheduled for presentation, the channel presenting the program, the format of the program (e.g., a drama series), an indication of whether the program was previously presented or if it is a new episode, ratings information, and accessibility information. The information in the program details area 132 may be retrieved from web sites and services, such as a television/cable/satellite listings service and/or a movie/television information database.

The image details area 140 presents images and image information associated with the program. The images are retrieved by performing a search, for example, of the Internet, images previously retrieved from the internet, or another corpus, such as a structured collection of images, using the search term or other information associated with the program.

The search details area 142 presents web pages and web page information associated with the program. The web pages are retrieved by performing a search, for example, of the internet using the search term or other information associated with the program.

In addition, the details page 106 may include a video details area. FIG. 1D shows a video details area 170 that may be included in the details page 106 (but for a different program in this example). The video details area 170 may present a thumbnail image or sample frame or frames (e.g., a short clip) of the video and a link to where the video may be found.

The video or videos associated with the program may be retrieved by performing a search, for example, of the internet using the search term or other information associated with the program, or a search of videos at a site such as YouTube. The videos may include videos of other episodes of the program, or may include publicly made videos about the program, among other things.

As one example, keywords may be associated with a program, either manually or by analysis of characteristics of the program and a transcript of the episode. Those keywords may be used to identify matching videos. For example, an episode of JAG may include extensive discussions of aircraft carrier jet landings (as determined from a closed caption script of the program), so that video details area 170 for that episode includes results of videos showing spectacular carrier landings.

A user may select one of the images 140a-d and be directed to a web page where the image may be found. In addition, the user may select one of the web page links 142a-c to be directed to the web page where a reference to the program was found. In certain implementations, the user may input a rating and/or comment for the program. Other users may then view the rating (or a composite rating from multiple users) and/or comment provided by the user. In certain implementations, a user may customize the types of information presented in the details page 106, such as images, web pages, videos, or other media.

Figure 2A:
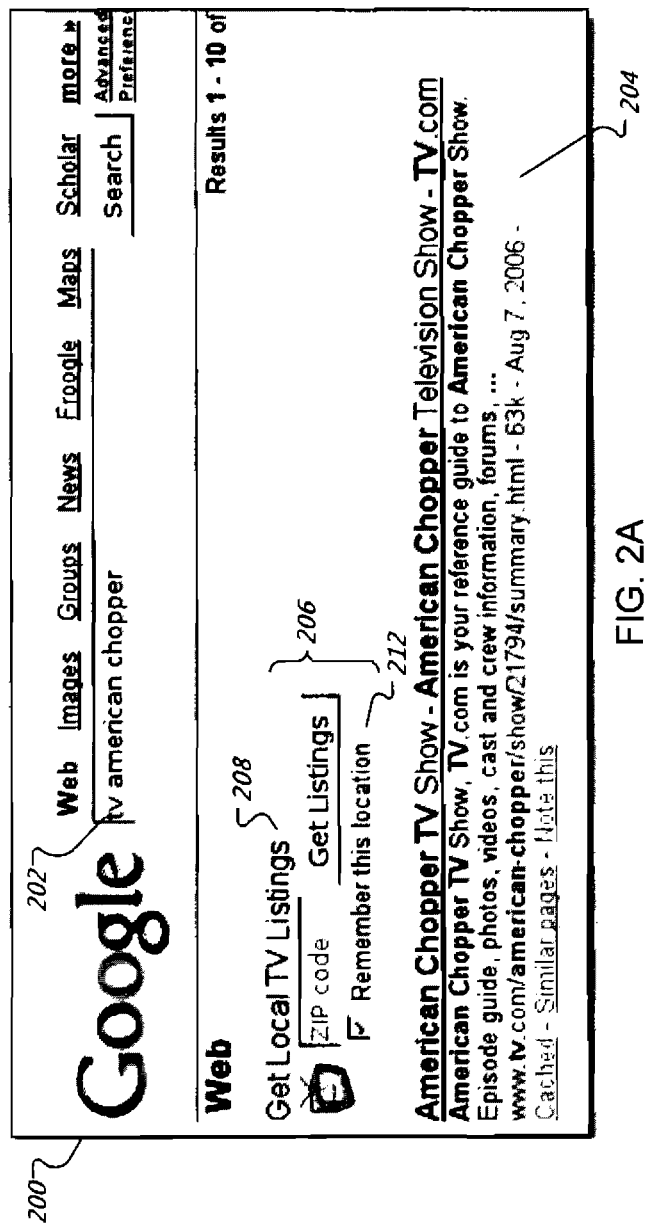
FIG. 2A shows a display for resolving a head end for a user of a program guide service.

FIG. 2A show a display 200 for resolving a head end for a user of a program guide service. The display 200 is a web search page. The display 200 includes a search control 202 where a user may input an Internet search term. The program guide service determines that the search term may be related to a media program. For example, the program guide service may recognize the search term as the name of a program or an episode of a program. Alternatively, the program guide service may recognize a keyword in the search term, such as "television," "TV," or "movie," indicating that the search term may be related to media programming.

In addition to web page search results 204, the program guide service will present media programming information in a media program information area 206. However, in order to determine the media providers, or head ends, accessible to or used by the user, the program guide service may request additional information from the user. The display 200 includes a location identification control 208. In this example, a ZIP code or postal code is requested from the user using the location identification control 208. In another example, other location identification may be used, such as a country, region (e.g., state or province), and/or city. The user may select a "Get Listings" control 210 to retrieve media program information associated with the search term in the search control 202 and available in the location specified in the location identification control 208. The display 200 also includes a "remember this location" control 212. If selected, the user's location information may be stored, for example, in a database at a web server or in a cookie at a client device, and used in a subsequent media programming search.

Referring to FIG. 2B, there is shown a display 220 that is a portion of a media program search details page, which may be, in appropriate circumstances, an alternative form of display to that shown in FIG. 10. In general, display 220 shows detailed results for a user and a program in a number of different areas, and shows information about particular episodes of a program on a series of visually stacked cards.

The display 220 includes a search control 222. The search control 222 may receive a search query, much like the standard Google search page. Queries submitted by the search control may be directed by the system to locating media-related content. That the query is related to media may be made known to the system in a variety of manners. For example, the code that generates display 220 may append a search term such as "tv:" in front of the query submitted by a user so that that term is added to the query and narrows the results returned for the query, or may be entered according to a format by which a search engine will use the prefix as a mechanism by which to limit the corpus of documents (e.g., web pages, images, and other information) that may be searched for the remainder of the query.

By submitting the query as a media-specific query, the user may be provided with results, like those shown in the rest of FIG. 2B, that are specially formatted for displaying media information. In the example that is shown, those results include a contact list 224 for the user. The list 224 may be an instant messaging contact list that shows the current status of acquaintances of the user. The list may be used in a variety of manners, such as to send media identifiers to people on the list 224 that permit those people to acquire and watch a media program sent to them by the user. For example, selection of one or more people on the list accompanied by selection of a sharing control may cause a hyperlink or similar object to be electronically mailed or instant messaged to the selected people, so that their selection of the hyperlink causes the program to be displayed to them or causes the program to be added to a set of programming for those people, such as on their personalized channels, as discussed above.

A tags area 234 allows a user to see and edit tags associated with a media program. For example, the user may add tags that are adjectives or nouns that they believe are descriptive of the media program. As one example, a user may select a tag of "explosions" or "terrorist" for a particular episode of the Fox series 24. The tags may otherwise by managed and used in a standard manner for tagging of web—accessible content.

A card stack 226 is generated for the display 220 to represent multiple episodes of a particular program—here, Mythbusters from The Discovery Channel. Each card in the card stack 226 may represent an episode (or, e.g., for movies, a particular movie in a series or a particular movie in which an actor appears, as simple examples). Each card in the stack 226 may include a title such as titles 226a, 226b which may be made visible whether the particular card is on the top of the stack or not. The titles may be the title of movies, for example, or the titles that producers have given to each episode in a program series.

A displayed card may include a number of areas. As shown in the figure, an episode summary area 232 shows a synopsis for an episode and can also show information like that provided in details area 132 and information 166 of FIG. 1C. In addition, a parental rating for the program can be provided, as can a control that, when selected, causes a PVR associated with the system providing the display 220, to record the episode.

A search results area 230 can display various types of search results associated with the episode. Although web results are shown in the figure, other results, such as image, shopping, video, or other results may be shown. The web results may be generated, for example, by supplying the title of the program and key words from the episode title and/or tags for the episode, to a standard search engine. The search may apply across one or more corpuses, such as general web search, only across particular media-related web sites, or across other such groups of data.

A video search area 234 shows videos that may be available for viewing and that relate to the program and/or episode in some manner. For example, if the program is the Star Wars series of movies, and the episode is Return of the Jedi, the video search may return one of the Lego-based reenactments of the Star Wars movies that are available on the Web.

An image search area 236 may provide similar search result from a corpus including images, such as the Google Image Search service. The images may be filtered or otherwise directed to television, such that, for example, images of actor/politician Fred Thompson are shown, but images from the resume page of a lawyer in Newark that happens to be named Fred Thompson, are not.

An "I Like This" control 238 may be selected by a user to indicate that they like a particular episode that is shown. Such a selection may trigger a number of actions in a system that has generated display 220. For example, a profile associated with the user may be altered to reflect the preference. The profile or other information may be used to better present to the user program recommendations and relevant advertisements that the user may enjoy more than non-targeted programs and advertisements. Also, the user's relationships in a social network may be affected, such as by propagating information about the user's preference to profiles or other classification information for the user's acquaintances, or by notifying the acquaintances so that they can easily select the episode for viewing.

An advertisements area 240 may also be displayed, and may show various forms of advertisements targeted to the user and/or the program or episode. For example, characteristics of the user may be used for the targeting, as may content of the display 220 or of information sources that generated the content for display 220, such as by using analysis like that performed by the well-known Google Adsense service.

FIG. 3 shows an example of a schedule bar 300, or calendar bar, for use with a program schedule grid. The schedule bar 300 includes a currently selected date indictor 302. The date indictor 302 corresponds to a selected tab of a day selection control 304. The selection control 304 allows a user to select a particular day of the week or date to present in the schedule grid associated with the schedule bar 300. Generally, one or more weeks of worth of days will be shown for selection by a user. Here, Friday has been selected, as indicated by the connection of the "Fri" tab to the lower row of the schedule bar 300.

The user may select a "Now" control 306 to move the schedule grid to the current date, and a "Next week" control 308 to move the schedule grid to the next week on the same day and time. The selected tab shows the hours of the day in a time control 310. The time control 310 contains a highlighted time span 312. The time span 312 indicates the range of times that are presented in the corresponding schedule grid (see FIG. 1B). The user may select a particular time in the time control 310 or select and drag the time span 312 to move the schedule grid to a new time.

Figure 4A:
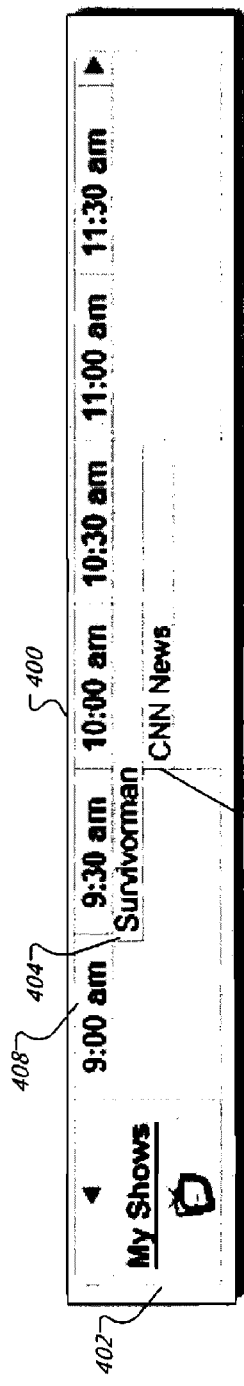
FIG. 4A shows an example display for a personalized media channel.

FIG. 4A shows an example display 400 for a personalized media channel 402. The particular displayed channel 402 includes two media programs 404 and 406. The programs 404 and 406 may be added to the channel 402, for example, by selecting and dragging the programs from a media result grouping or a schedule grid to the channel 402. Multiple episodes may be added to the channel when such a selection is made.

Alternatively, programs in the groupings or the schedule grid may include controls that add the programs to the channel 402. Other forms of media may be added to the channel 402, such as over-the-air broadcast radio, Internet radio, web casts, or content from a digital music player. Where gaps in the programming occur, the gaps may be filled with content such as music or advertisements, which may be downloaded from an internet-accessible source, and may be selected according to characteristics of the user and/or characteristics of the programming, or a combination of the two. For example, as described above, the dialogue in a program may be analyzed by using the closed caption text for the program. The ads may be targeted to keywords associated with the user and/or the program.

In certain implementations, the user may control a home media player using the channel 402. For example, the user may build a list of video programs and audio interludes between the video programs to be presented using the home media player. Certain content, such as the interludes or bumper content (including advertisements), may be automatically suggested or inserted by the system. The selected programs may then be downloaded and/or recorded while being broadcast, and may be stored for later playing with the home media player. Where programming selected by a user overlaps in time, various mechanisms may be used to permit the user to watch all selected shows.

The display 400 includes a time indicator 408. In this example, the programs 404 and 406 are presented concurrently in their original channels. The user may perform actions using a program, such as recording the program with a digital video recorder. The user may then view the programs 404 and 406 at time of the user's choosing.

In certain implementations, a user may make all or a portion of the channel 402 available to another user. The other user may have the ability to view the programs in the channel 402. The other user may also have the ability to add or remove programs from the channel 402. For example, the user that created the channel 402 may give the other user specific permissions to the channel 402, such as read-only or read/write. In this manner, collaborative media sharing may occur with relative ease. In addition, when media to be played for a user is locally stored media rather than streaming media, a device for one user may transfer the media content to a device for the other user is appropriate circumstances, subject to digital rights management technology present in the systems.

Figure 4B:
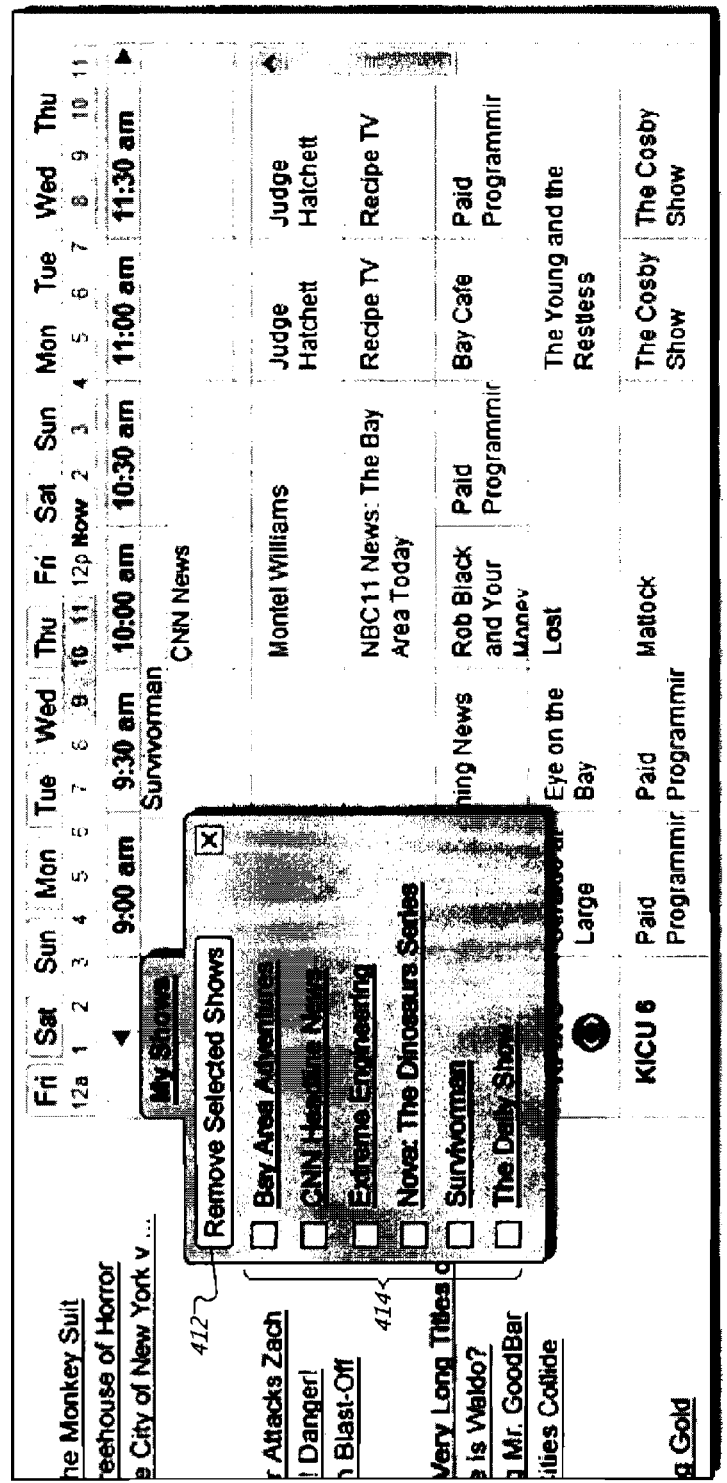
FIG. 4B shows an example mechanism for editing content on a personalized media channel.

FIG. 4B shows an example display 410 for editing content on a personalized media channel. The display 410 includes a remove selected shows control 412 and selection controls 414 corresponding to each of the programs in the personalized channel. A user may select one or more selection controls 414 by checking each show and may then select the remove selected shows control 412 to remove the selected programs from the personalized channel. Alternatively, the user may select a program in the personalized channel directly and drag it out of the personalized channel or the program may have a pop-up menu that allows the program to be removed from the personalized channel (e.g., on right clicking on a cell for the program).

FIGS. 5A-5D show example displays providing program guides and details for such guides. In general, the displays provide users with the ability to view programming information in a variety of environments and in a variety of formats. In particular, the programming that is displayed may be directed to a user's personalized channel, so as to show upcoming programming selected by and/or for the user. Examples of display environments include in a portable program module such as a gadget on the Google Desktop or on the Google Personalized Homepage, a user's personal calendar (e.g., in Microsoft Outlook), or in a user's browser or an on-screen guide.

Figure 5A:
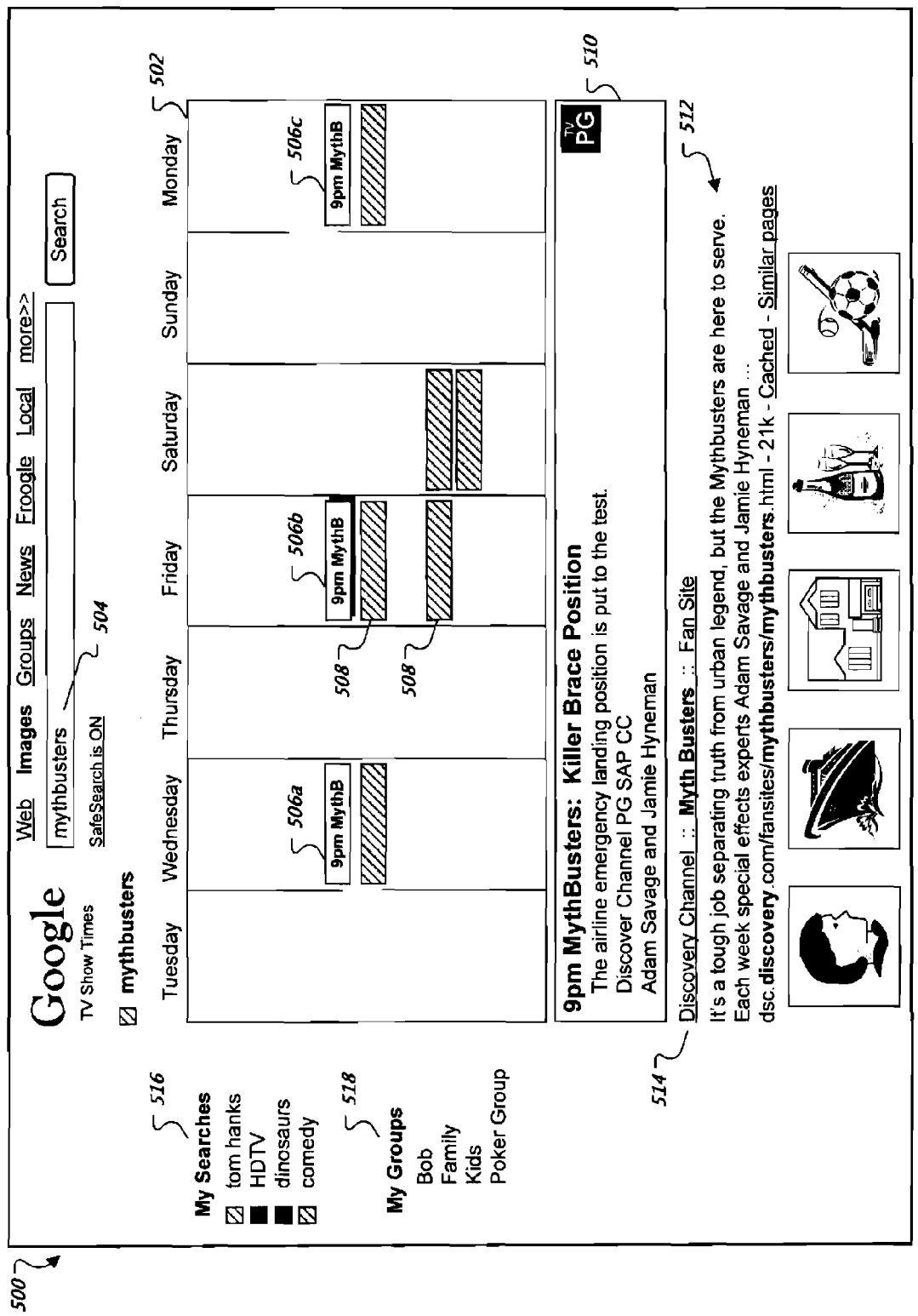
FIGS. 5A-5D show example displays providing media search results and details for such results.

FIG. 5A shows a display 500 of a program guide. In general, the display 500 is shown in a user's calendar format. The display 500 includes a program guide grid 502 that may display a number of programs that the user has selected to view or that may have been selected for the user. For example, the user in this example, has selected to have all episodes of the program "Mythbusters" selected for them.

The grid 502 can be organized by day (e.g., as depicted with column headings "Tuesday" through "Monday") and by time (e.g., in half-hour intervals) (not shown). Each instance 506a-506c of a program (e.g., an episode) related to "mythbusters" includes a time (e.g., "9 pm") that the program is presented and the name (e.g., abbreviated to "MythB") of the program instance. For example, each name 506a-506c (e.g., 506b shown highlighted or selected by the user) includes a link that moves an associated schedule grid to the program instance, or that opens a details display like those discussed above for FIG. 1B and FIG. 1C, respectively.

Other program instances 508 not related to the search term "mythbusters" may be grayed out (as depicted) or de-emphasized in some other way. Selecting the name 506b may also present more information about the program, such as by opening a details area 510 or by displaying a web link area 512. By selecting the corresponding link 514, the user may access the web site corresponding to the web link area 512. The display 500 also includes a My Searches area 516 which the user can use, for example, to track and reuse previously-issued searches on the display 500. In additional, the display 500 includes a My Groups area 518 which the user can use, for example, to list groups of media content, such as types or categories of television shows (e.g., family shows, kid shows, etc.). The categories may be pre-established by the system, or may be provided or edited by the user also.

The display format of FIG. 5A may provide a number of advantages in certain implementations. For example, the episodes may be included as appointments in a user's standard calendar, so that the user need not leave a familiar interface to determine what their evening schedule is. In this example, programs can be treated like meetings. Also, the display 500 can show conveniently when there are programming overlaps, so that a user can quickly rectify them such as by dragging programs up or down, in a manner similar to rescheduling appointments in a scheduling program.

Figure 5B:
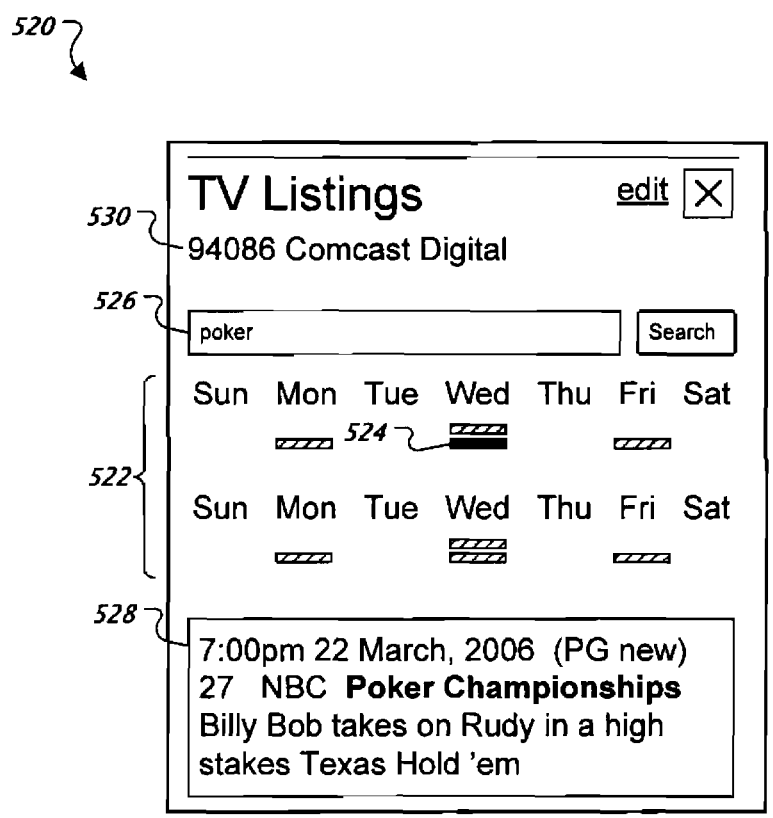

FIG. 5B shows a compact program guide 520, in the form of a portable program module such as a gadget. Such a guide 520 may be displayed as part of a larger home page, such as a personalized home page like the Google Personalized Homepage. The guide 520 may show programming to be displayed to a particular user, or may be shared with other users by incorporation of the guide 520 into a public web page.

For example, someone interested in poker may display a poker-related home page that contains the guide 520, such as in a corner of the web page. The compact program guide 520 includes a program grid 522 that can be organized by day and time as depicted. Instances (e.g., instance 524) in the grid 522 can represent a program episode and can correspond to a search term 526 (e.g., "poker") entered by the user to display particular program information. By clicking on instance 524, for example, the user may see addition information regarding the show in a details box 528. The box 528 can list the time of the program, its rating (e.g., G, PG, etc.) and a brief synopsis of the program instance. The compact program guide 520 can also include a location identification control 530 that includes a ZIP code and provider (e.g., "95086—Comcast Digital") associated with the program.

Where the guide 520 is personal to a particular user, the user may be permitted to move episodes around to create a personalized programming schedule, such as if the user's system is connected to a PVR. Where the guide 520 is provided on a public page, controls may be provided to let visitors to the page add the programming content to their own personalized channels. For example, a user could drag an instance 524 from the guide 520 to a bar representing their personalized channel, or a selection button may be provided in details 528 whose selection will result in the addition of a program to a user's personalized channel (e.g. by placing it in a list of content that the user may later select to view).

The display format of FIG. 5B may provide a number of advantages in certain implementations. For example, users may include media programming information in a compact form, among many other sorts of information (e.g., weather, stock prices, etc.) they may be tracking. In addition, users may share media programming more easily such as by showing preferred programs in a portable program module that is part of a web page. In this way, social networks can be better formed, and companies may more easily drive viewers to certain programs. For example, Field & Stream Magazine could provide a media guide on its web site, showing various outdoors programs that are being broadcast on various outdoors, travel, and nature channels. Readers of Field & Stream may benefit (and Field & Stream may in turn benefit) by being able to see such programming easily and to add it to their own personalized channels. In addition, if Field & Stream is the producer of some of the programming, it can easily point viewers to the programming, even if the programming occurs across multiple different channels.

Figure 5C:
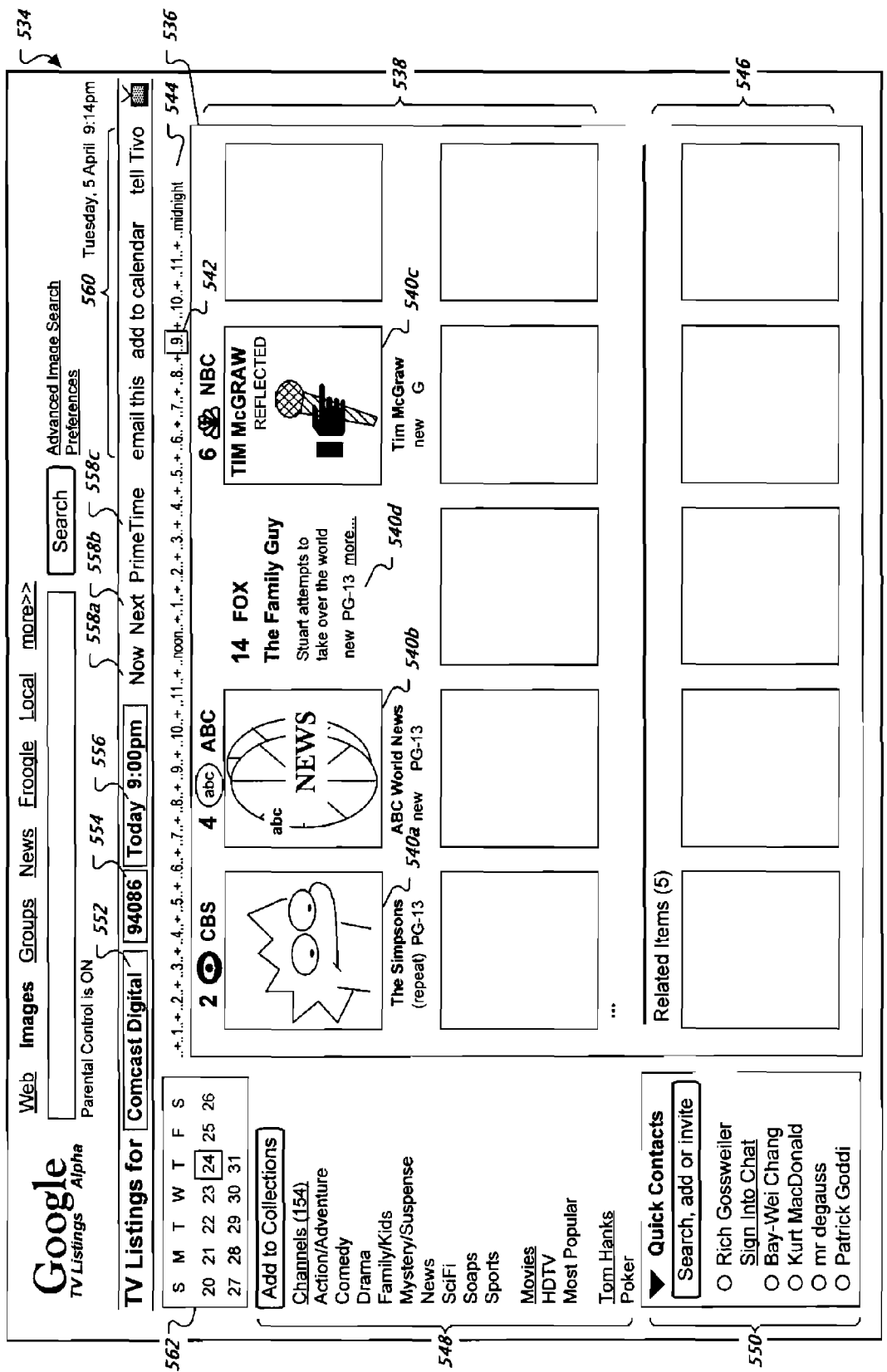

FIG. 5C shows a display 534 that includes an image-annotated program area 536. The display 534 may be particularly helpful in letting users quickly identify their preferred media programming, without having to read through all of the entries.

The program area 536 may be displayed by selecting, for example, a control on the display 500 to change the display method of the program guide information to the image-annotated program grid 538. The grid 538 can include program instance images 540a-540d. Each of the images 540a-540d can correspond to a scheduled program on a different television channel. The scheduled programs displayed in the grid 538 can correspond to a time slot 542 (e.g., 7 pm) that the user may select from a time slot control 544. For example, if the user selects the 7 pm timeslot 542 from the control 544, the program instance images 540a-540d that are displayed can represent TV episodes airing at 7 pm. Specifically, program instance image 540a can represent "The Simpsons" on CBS at 7 pm, image 540b can represent the ABC World News on channel 4, image 540c can represent Tim McGraw Reflected on NBC, and so on. Programs for which no image is available (e.g., program 540d) can be summarized by text. Moreover, by clicking on or floating over the image of a program, a brief synopsis and other information regarding the program (e.g., program title, rating, and the like) can be displayed to the user.

The display 534 can include images of other related items 546, such as non-television-related content. The user may employ collections area 548 and quick contacts area 550 to categorize program information or to notify others about specific program information. For example, the user may select an instance from either the program grid 538 or the related items 546 and add the instance to a collection of related content by selecting a corresponding category name (e.g., "Action/Adventure" or "Comedy") from the collections area 548. The user may also contact a friend (e.g., Rich Gossweiler) listed in the quick contacts area 550 and send, for example, information about content of either the program grid 538 or the related items 546.

The display 534 can include general information about the TV listings displayed in the grid 536, such as provider information 552 (e.g., "Comcast Digital"), the ZIP code 554 of the user, and the time slot 556. In addition to the time slot control 544 for selecting a specific time, the user may use controls 558a-558c to cycle through time slots. For example, clicking the Now control 558a can display programming playing at the current time. The Next control 558b can advance the grid 536 to the next time slot (e.g., in half hour increments). In addition, a user may click on the grid 538 and drag to navigate to other time slots or channels, much like they would for panning in Google Maps. The PrimeTime control 558c can advance the grid 536 to the first time slot of prime time (e.g., 7 pm Central Time), and may optional hide all time slots that are not prime time. Additional controls 560 may allow the user to email program information to a friend (e.g., one listed in the quick contacts area 550), add a program to a personal calendar (e.g., calendar 562) or automatically program Tivo to record the program.

Figure 5D:
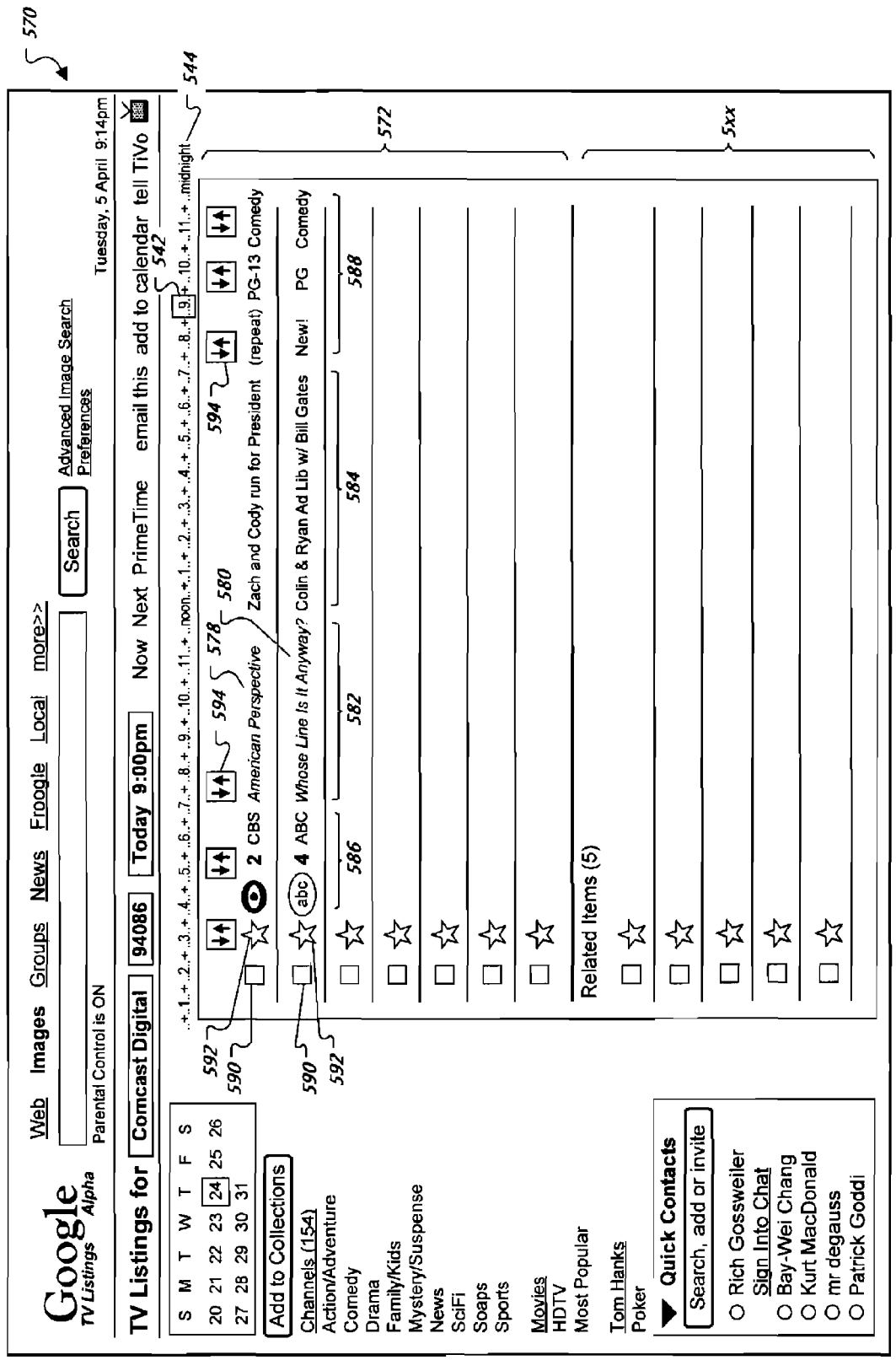

FIG. 5D shows a display 570 that includes a line-oriented program schedule 572. This display 570 may approximate a format of programs such as Google Mail, or GMail.

Such a schedule 572 may be displayed by selecting, for example, a control on either display 500 or 534 to change the presentation of the program guide information to the line-oriented program schedule 572. The program schedule 572 can include multiple areas, such as television program area 574 and related items area 576. For example, while TV programs may be listed in area 574, other types of media (e.g., web-based programs) may be listed in area 576. Each line in the area 574 can correspond to a particular program offered at a particular time, such as the 7 pm time slot 542 selected from the control 544. For example, listing 578 for American Perspective and listing 580 for Whose Line Is It Anyway correspond to 7 pm shows.

Information in the program schedule 572 can be presented in multiple columns. The column for the show name 582 can list the name of each show (e.g., American Perspective). The synopsis column 584 can provide a brief summary of the corresponding show. Channel column 586 can identify the channel number, the call letters or name (e.g., ABC or Fox), and show the symbol (e.g., the CBS eye). Controls 590 (such as checkbox) can allow the user to select one or more listings (e.g., 578 or 580), such as to add to categories of programming, or to select a program for recording or adding to a personalized channel.

Other controls (such as stars) may allow the user to add shows to a list of "Favorites." Column sort controls 594 can allow the user to sort the entries in the schedule 572 by a specific column, and toggle between ascending and descending sorted order within that column. The schedule 572 may also include scroll bars or other controls (not shown) that can allow the user to view parts of schedule that may not fit on the screen. For example, one or more listings included in the schedule 572 may be removed from the top when the user scrolls down within the list.

Figure 6:
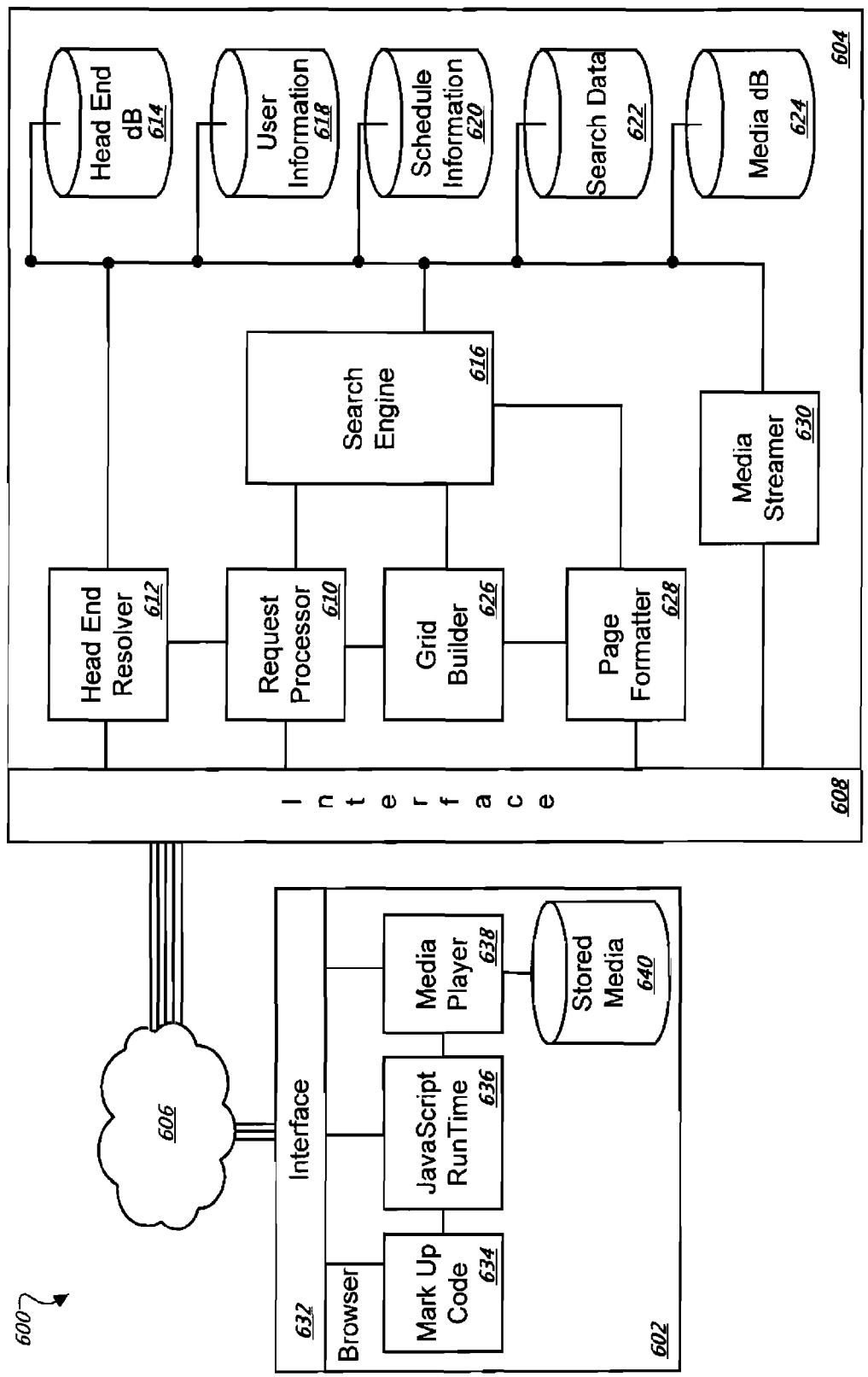
FIG. 6 is a schematic of an example system for accessing media programming.

FIG. 6 is a schematic diagram of an example system 600 for accessing media programming. The system includes a client 602, a server 604, and a network 606 such as the internet connecting the two. The server 604 may communicate through an interface 608, which may itself include one or more web servers. Media-related requests from the client may be identified by the interface and routed to the request processor 610. The request processor may parse the requests into their constituent parts to determine the sort of information requested by the client 602. For example, if the request is a media-related search request, the request processor may pass the search terms to search engine 616, which may return one or more search results in a conventional manner. Also, the search engine 616 may return a media one box, like those described above, where the request is determined to be media related.

Also, if a head end has not been associated with the client 602, a head end resolver 612 may be used to query the user for location information and other information (such as telecom provider) that may help in selecting a head end for the user with information stored in a head end database 614. A head end typically describes a particular source of programming for a user that is unique among various possible sources.

Where a user requests a landing page, grid builder 626 may provide code and generate data for display of a program grid at a particular date and time for a user. The grid builder 626 may receive signals, such as from search engine 616, regarding the position in the grid that is to be displayed on the client 602. Grid information and search information may be provided to a page formatter 628, which may generate code for the display of pages like those shown in FIGS. 1A-1C and 5A-5D. User information 618 may, among other things, indicate a format for the display of a program guide grid, and page formatter 628 may generate code for displaying programming information in the appropriate format, such as the formats shown in FIGS. 5A-5D.

The page formatter 628 may also draw on other sources, such as image search results provided by search engine 616, and structured media data stored in media database 624. For example, relationships between and among actors and programs may be stored for display on a details page as shown above.

Various databases may also be accessed by system 600. For example, user information database 618 may contain personalized information about users. Such information may include, for example, favorite channels of the user, the content of the user's personalized channel and other information that may be used to generate custom displays like those shown in FIGS. 1A-C. The data may be accessed, for example, in response to requests form JavaScript running on the client, and may be supplied via XML or other format for use in an asynchronous fashion. Also, schedule information 620 may be provided, such as to grid builder 626 for display of programming information.

Media streamer 630 may be used where streamlining media is provider by the system 600. The media streamer 630 may take any appropriate form and may be triggered based upon a display request from the client 602 when a particular program is set for display on the client 602.

Figure 7:
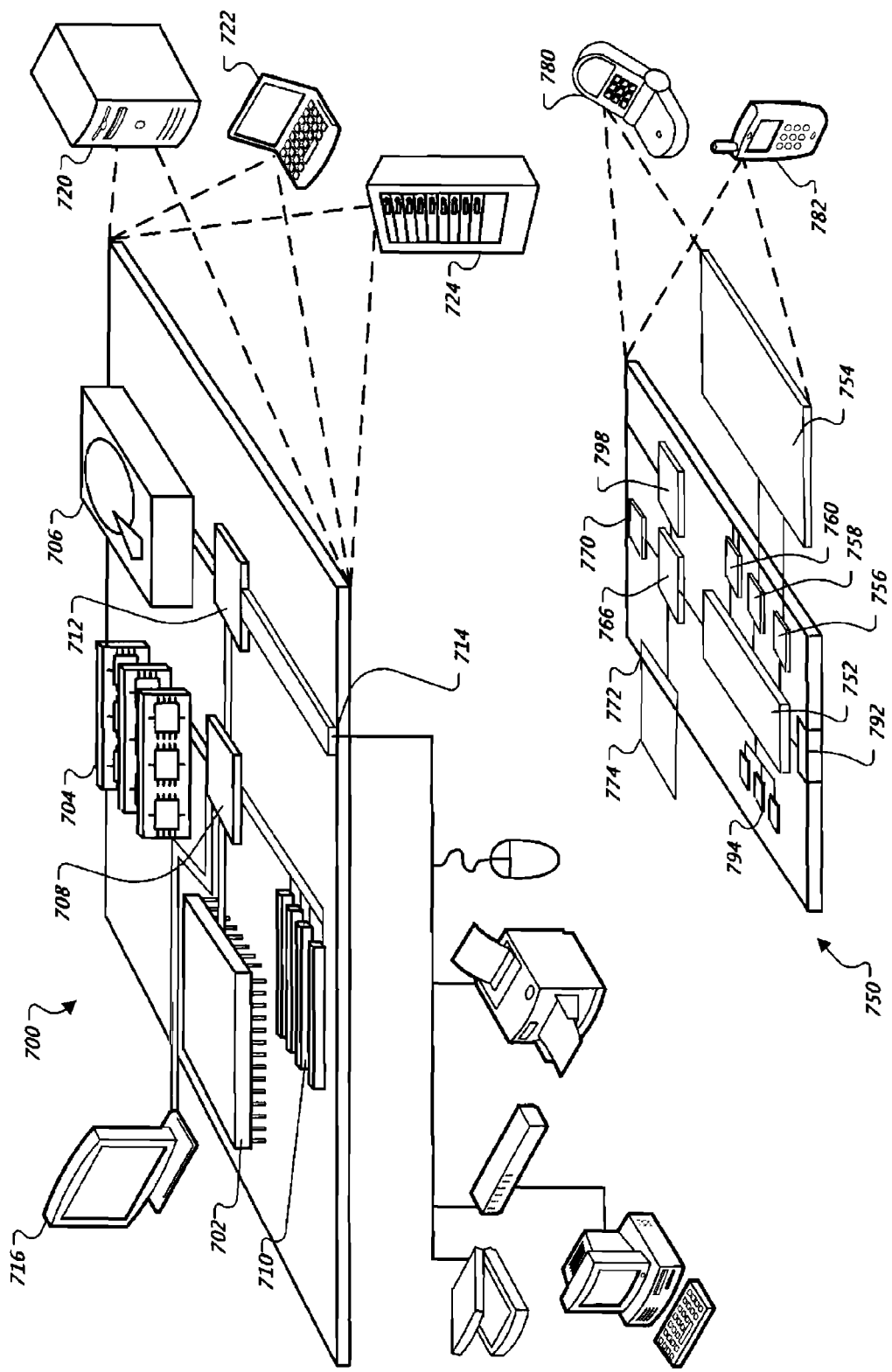
FIG. 7 shows an example of a computer device and a mobile computer device that can be used to implement the techniques described here.

FIG. 7 shows an example of a computer device 700 and a mobile computer device 750 that can be used to implement the techniques described here. Computing device 700 is intended to represent various forms of digital computers, such as laptops, desktops, workstations, personal digital assistants, servers, blade servers, mainframes, and other appropriate computers. Computing device 750 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 700 includes a processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, are interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

The memory 704 stores information within the computing device 700. In one implementation, the memory 704 is a volatile memory unit or units. In another implementation, the memory 704 is a non-volatile memory unit or units. The memory 704 may also be another form of computer-readable medium, such as a magnetic or optical disk.

The storage device 706 is capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

The high speed controller 708 manages bandwidth-intensive operations for the computing device 700, while the low speed controller 712 manages lower bandwidth-intensive operations. Such allocation of functions is exemplary only. In one implementation, the high-speed controller 708 is coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 includes a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, are interconnected using various buses, and several of the components may be mounted on a common motherboard or in other manners as appropriate.

The processor 752 can execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

Processor 752 may communicate with a user through control interface 758 and display interface 756 coupled to a display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

The memory 764 stores information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

The computing device 750 may be implemented in a number of different forms, as shown in the figure. For example, it may be implemented as a cellular telephone 780. It may also be implemented as part of a smartphone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network).

Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made. For example, various forms of the flows shown above may be used, with steps re-ordered, added, or removed. Also, although several applications of the electronic program guide systems and methods have been described, it should be recognized that numerous other applications are contemplated. Moreover, although many of the embodiments have been described in relation to an electronic program guide, that term should be understood to include various forms of mechanisms for presenting media programming information. Accordingly, other embodiments are within the scope of the following claims.

What is claimed is:

1. A computer-implemented method, comprising:
receiving at a computer system a request associated with a user for media-related programming information;
obtaining, from a personalized media schedule of the user stored by the computer system, a plurality of media episode indicators for a time period associated with the request and with the user, wherein the personalized media schedule for the user comprises indicators for a plurality of media programs to be broadcast by a plurality of media providers that the user previously selected from a schedule of programs for inclusion in the personalized media schedule, each media program associated with a viewing time selected by the user which can be different than a broadcast time of the media program;
generating with the computer system code for displaying the plurality of media episode indicators in a personal calendar associated with the user at calendar times that correspond to the associated viewing times selected by the user, wherein the personal calendar is displayed in a format that is preconfigured for the user;
receiving a selection of a media episode indicator displayed at a first viewing time in the calendar and receiving an indication of a second viewing time in the personal calendar, the second viewing time being a revised viewing time selected by the user for a media program associated with the selected media episode indicator; and
generating code for displaying the media episode indicator in the calendar at the revised second viewing time different from the first viewing time, and rescheduling the viewing time of the media program in the personalized media schedule to the second viewing time, the media episode indicator being displayed in the same interface in the personal calendar as personal schedule information for the user that is unrelated to the media episode indicator and media programs;
wherein the plurality of media programs included in the personalized media schedule are presented to the user with a media player/recorder controlled in accordance with the personalized media schedule at the viewing times selected by the user, and as a result of receiving the revised viewing time, updating personalized media schedules provided to one or more other users determined to have an acquaintance relationship with the first user in a social network system.

2. The method of claim 1, wherein the request is received from a gadget on a personalized web page associated with the user.

3. The method of claim 2, wherein each media episode indicator includes an icon, and wherein selection of the icon causes details regarding a program that corresponds to the media episode indicator to be displayed.

4. The method of claim 1, further comprising determining the media episode indicators that are associated with the user by searching a user information database storing a personalized media schedule of programs selected by the user.

5. The method of claim 1, further comprising receiving from the user a selection of one or more media programs to add to the personalized media schedule for the user, and generating code for displaying media episode indicators corresponding to the added media programs in the calendar.

6. The method of claim 5, wherein the selection of one or more media program comprises clicking on one or more media episode indicators corresponding to the one or more media programs followed by dragging of the one or more media episode indicators to an area defined by the calendar.

7. The method of claim 1, further comprising receiving a command to share a program and creating an invitation to join a showing of the program to a second user.

8. The method of claim 1, further comprising adding information about the plurality of media programs to a general daily calendar schedule of the user.

9. The method of claim 1, further comprising generating code for displaying categories of programs in the calendar and for showing different categories with differing visual groupings.

10. The method of claim 1, further comprising:
receiving a search request including media-related terms;
generating a response to the request of one or more programs, the response comprising grouped search results that pertain to the media-related terms and that include:
(a) a list of web pages, particular ones of the listed web pages identified by a title indicator, a snippet indicator, and a uniform resource locator; and
(b) a list of media programming items, particular ones of the listed media programming items identified by a title indicator, a broadcast time indicator, and a channel indicator; and
generating code for displaying on the calendar the grouped search results listed in the list of media programming items.

11. The method of claim 1, further comprising generating one or more advertisements targeted to content in the calendar.

12. A computer implemented method, comprising:
receiving at a computer system a user command to display a personal calendar of the user;
submitting with the computer system a request to a central information provider for calendar-related information;
in response to the request, receiving at the computer system calendar-related information including personal schedule information of the user combined with personalized media programming of the user obtained from a personalized media schedule of the user, and displaying the personal calendar that includes indicators for the personalized media programming, wherein the personalized media schedule for the user comprises a plurality of media program episodes previously selected by the user for inclusion in the personalized media schedule, each media program episode associated with a user-selected viewing time that can be different than a broadcast time of the media program, wherein the personal calendar is displayed in a format that is preconfigured for the user;

receiving a selection of a media episode indicator displayed at a first viewing time in the calendar and receiving an indication of a second viewing time in the calendar, the second viewing time being a revised viewing time selected by the user for a media program associated with the selected media episode indicator; and displaying the media episode indicator in the calendar at the revised second viewing time and not the first viewing time and rescheduling the viewing time of the media program in the personalized media schedule to the second viewing time, the media episode indicator being displayed in the same interface as personal schedule information that is in the personal calendar and is unrelated to the media episode indicator and the media programs;

wherein the plurality of media programs included in the personalized media schedule are presented to the user with a media player/recorder controlled in accordance with the personalized media schedule at the viewing times selected by the user, and as a result of receiving the revised viewing time, updating personalized media schedules provided to one or more other users determined to have an acquaintance relationship with the first user in a social network system.

13. The method of claim 12, further comprising alerting the user of conflicts between personal schedule information and personalized media programming in the calendar.

14. The method of claim 12, wherein the user command is received by a portable program module in a personalized home page.

15. The method of claim 14, further comprising displaying detail about a program in the calendar when a pointer floats over a visual presentation for the program.

16. The method of claim 12, further comprising displaying a plurality of media-related search results having one or more program groupings simultaneously with the calendar.

17. The method of claim 12, further comprising receiving a selection of a control associated with a program displayed in the calendar, and displaying a details page containing particularized information about the selected program.

18. A computer-implemented system, comprising:
a request processor for receiving and parsing requests for media programming related information;
a user information database storing information relating to media programs in personalized program guides for a plurality of users, wherein a personalized program guide for a particular one of the users comprises a plurality of media program episodes selected by the user from a schedule of program episodes to be broadcast by a plurality of media providers for inclusion in the personalized program guide, each media program episode associated with a user-selected viewing time that can be different than a broadcast time of the media program episode;

a grid builder configured to generate code for causing a display of personal calendars for registered users of the user information database, each personal calendar for a user including personal schedule information for the user and media programming information for the user obtained from the personalized program guide for the user, wherein the user can select a media episode indicator displayed at a first viewing time in the personal calendar and indicate a second viewing time in the personal calendar, the second viewing time being a revised viewing time selected by the user for a media program associated with the selected media episode indicator, the media episode indicator being displayed in the same interface as personal schedule information that is in the personal calendar and is unrelated to the media episode indicator and the media programs, and the grid builder is further configured to generate code for causing a display of the calendar for the user with the media episode indicator in the calendar at the revised second viewing time and not the first viewing time and to reschedule the viewing time of the media program in the personalized program guide for the user to the second viewing time; and wherein the plurality of media programs included in the personalized media schedule are presented to the user with a media player/recorder controlled in accordance with the personalized media schedule at the viewing times selected by the user, and as a result of receiving the revised viewing time, updating personalized media schedules provided to one or more other users determined to have an acquaintance relationship with the first user in a social network system.

19. The system of claim 18, wherein the grid builder generates XML data for processing by a portable program module in response to a JavaScript-initiated request.

20. The system of claim 18, wherein the grid builder generates code for processing by a portable program module with a redisplay of the calendar.

21. The system of claim 18, further comprising a page formatter configured to generate code for displaying one or more media-related search results simultaneously with the calendar.

22. The method of claim 10, wherein the grouped search results are grouped according to program genre.

* * * * *

UNITED STATES PATENT AND TRADEMARK OFFICE
CERTIFICATE OF CORRECTION

PATENT NO.        : 8,572,649 B1
APPLICATION NO.   : 11/742515
DATED             : October 29, 2013
INVENTOR(S)       : Richard C. Gossweiler, III et al.

Page 1 of 1

It is certified that error appears in the above-identified patent and that said Letters Patent is hereby corrected as shown below:

On the Title Page, Item (75):

Column 1, line 2, delete "Mehran Sahami, III," and insert -- Mehran Sahami, --, therefor.

Column 1, line 6, delete "Moutain View, CA (US);" and insert -- Mountain View CA (US); --, therefor.

Signed and Sealed this
Twenty-fifth Day of February, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,572,649 B1 | Page 1 of 1 |
| APPLICATION NO. | : 11/742515 | |
| DATED | : October 29, 2013 | |
| INVENTOR(S) | : Richard C. Gossweiler, III et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this
Fourteenth Day of April, 2015

Michelle K. Lee
*Director of the United States Patent and Trademark Office*